(12) United States Patent
Ichieda

(10) Patent No.: US 11,184,592 B2
(45) Date of Patent: Nov. 23, 2021

(54) PROJECTION SYSTEM, METHOD OF CONTROLLING PROJECTOR, AND PROJECTOR

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/179,749

(22) Filed: Feb. 19, 2021

(65) Prior Publication Data

US 2021/0266506 A1 Aug. 26, 2021

(30) Foreign Application Priority Data

Feb. 20, 2020 (JP) .............................. JP2020-027005

(51) Int. Cl.
*H04N 9/31* (2006.01)

(52) U.S. Cl.
CPC ......... *H04N 9/3194* (2013.01); *H04N 9/3152* (2013.01)

(58) Field of Classification Search
CPC .. H04N 9/3105; H04N 9/3185; H04N 9/3194; H04N 9/3152; H04N 9/31; H04N 9/3182; H04N 9/315; H04N 9/3197; G03B 21/28; G03B 21/20
USPC ...... 348/744–747, 806, 807; 353/30, 69, 73, 353/98, 99
See application file for complete search history.

(56) References Cited

U.S. PATENT DOCUMENTS

| | | | |
|---|---|---|---|
| 2019/0124309 A1* | 4/2019 | Ichieda | ................ H04N 9/3194 |
| 2020/0007835 A1 | 1/2020 | Ichieda | |
| 2020/0228767 A1 | 7/2020 | Ichieda | |

FOREIGN PATENT DOCUMENTS

| | | |
|---|---|---|
| JP | 2000-112651 A | 4/2000 |
| JP | 2006-098789 A | 4/2006 |
| JP | 2018-160803 A | 10/2018 |
| JP | 2020-005095 A | 1/2020 |
| JP | 2020-112711 A | 7/2020 |
| WO | 2018173739 A1 | 9/2018 |

* cited by examiner

*Primary Examiner* — Sherrie Hsia
(74) *Attorney, Agent, or Firm* — Dority & Manning, P.A.

(57) ABSTRACT

A projection system includes a recursive reflector located in a first area of a projection surface, a projection device configured to project a first image and a second image at respective timings different from each other, an imaging device configured to image a first projection area in a situation in which the projection device projects the first image in the first projection area including the first area to thereby generate imaging data, and a control device configured to identify a position of the recursive reflector based on the imaging data, and decide a second projection area in which the second image is projected based on the position of the recursive reflector, wherein the projection device and the imaging device are disposed so that a contrast ratio between the recursive reflector and a periphery of the recursive reflector becomes equal to or higher than a predetermined value.

11 Claims, 11 Drawing Sheets

PROJECTION SYSTEM, METHOD OF CONTROLLING PROJECTOR, AND PROJECTOR

The present application is based on, and claims priority from JP Application Serial Number 2020-027005, filed Feb. 20, 2020, the disclosure of which is hereby incorporated by reference herein in its entirety.

BACKGROUND

1. Technical Field

The present disclosure relates to a projection system, a method of controlling a projector, and a projector.

2. Related Art

JP-A-2006-98789 (Document 1) discloses a projector which uses a recursive reflector provided to a projection surface such as a whiteboard to set a projection area of a projection image. The projector described above images the projection surface on which the recursive reflector is located with an imaging section while projecting a white image on the projection surface from a projection section to thereby generate imaging data. The projector described above identifies the position of the recursive reflector based on the imaging data, and then decides the projection area of the projection image to be projected subsequently to the white image based on the position of the recursive reflector.

In the projector described in Document 1, when reflected light by the recursive reflector fails to enter the imaging section due to the positions of the projection section and the imaging section and so on, the imaging data fails to represent the recursive reflector, and it becomes difficult to identify the position of the recursive reflector.

SUMMARY

A projection system according to an aspect of the present disclosure includes a recursive reflector located in a first area of a projection surface, a projection device configured to project a first image and a second image at respective timings different from each other, an imaging device configured to image a first projection area in a situation in which the projection device projects the first image in the first projection area including the first area to thereby generate imaging data, and a control device configured to identify a position of the recursive reflector based on the imaging data, and decide a second projection area in which the second image is projected based on the position of the recursive reflector, wherein the projection device and the imaging device are disposed so that a contrast ratio between the recursive reflector and a periphery of the recursive reflector represented by the imaging data becomes equal to or higher than a predetermined value.

A method of controlling a projector according to another aspect of the present disclosure is a method of controlling a projector including a projection section configured to project an image and an imaging section configured to perform imaging, the method including the steps of projecting a guide image representing a first area in which a recursive reflector is to be disposed out of a projection surface from the projection section, projecting a first image in a first projection area including the first area in which the recursive reflector is disposed from the projection section, imaging the first projection area with the imaging section in a situation in which the projection section projects the first image in the first projection area to thereby generate imaging data, identifying a position of the recursive reflector based on the imaging data, and deciding a second projection area in which the second image is projected by the projection section based on the position of the recursive reflector, wherein the first area is set so that a contrast ratio between the recursive reflector and a periphery of the recursive reflector represented by the imaging data becomes equal to or higher than a predetermined value.

A projector according to another aspect of the present disclosure includes a projection section configured to project a guide image representing a first area in which a recursive reflector is to be disposed out of a projection surface, and project a first image in a first projection area including the first area in which the recursive reflector is disposed after projecting the guide image, an imaging section configured to image the first projection area in a situation in which the projection section projects the first image in the first projection area to thereby generate imaging data, and a decision section configured to identify a position of the recursive reflector based on the imaging data, and decide a second projection area in which a second image is projected by the projection section based on the position of the recursive reflector, wherein the first area is set so that a contrast ratio between the recursive reflector and a periphery of the recursive reflector represented by the imaging data becomes equal to or higher than a predetermined value.

DESCRIPTION OF AN EXEMPLARY EMBODIMENT

A. First Embodiment

A1. Projection System 1000

Figure 1:
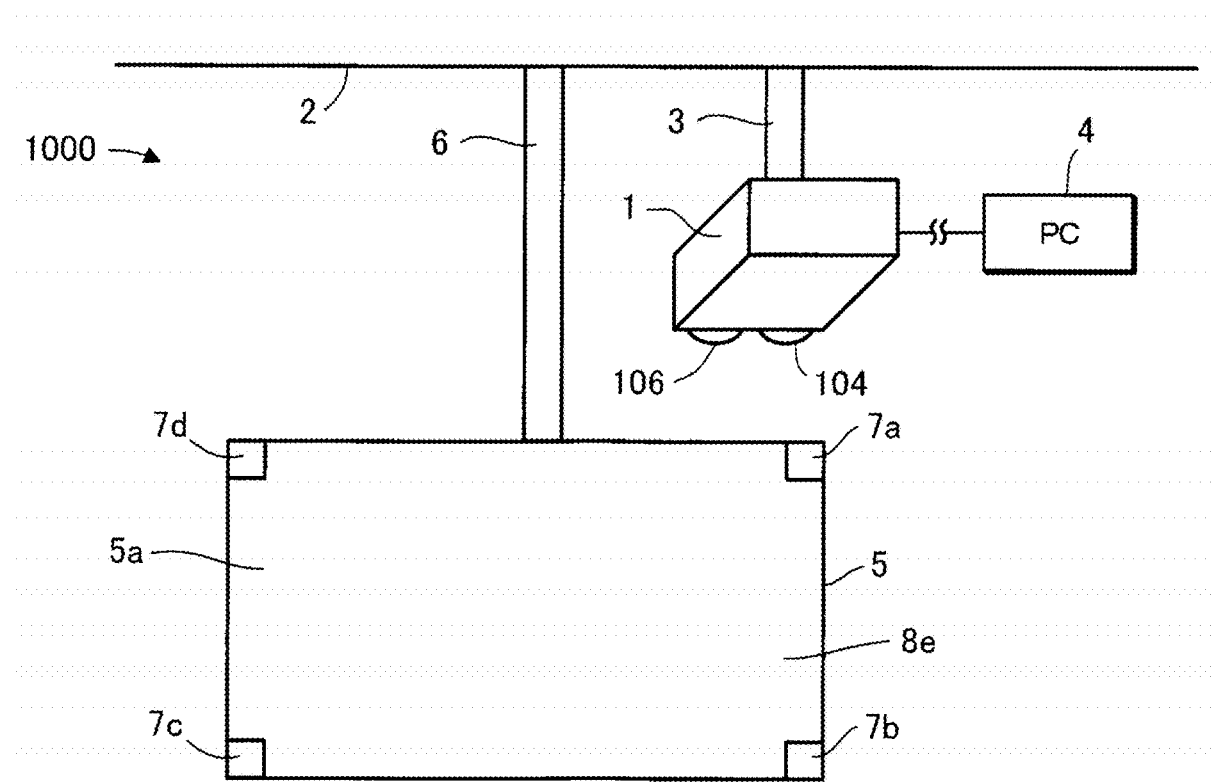
FIG. 1 is a diagram showing a projection system.

FIG. 1 is a diagram showing a projection system 1000 according to a first embodiment. The projection system 1000 includes a projector 1, a first object 7a, a second object 7b, a third object 7c, and a fourth object 7d.

The projector 1 is supported by a first support device 3 installed on the ceiling 2. The first support device 3 can be installed on a wall or the like instead of the ceiling 2. The projector 1 is coupled to a PC (Personal Computer) 4 with a wired LAN (Local Area Network), a wireless LAN, or the like. The coupling between the projector 1 and the PC 4 is not limited to the wired LAN or the wireless LAN. For example, the projector 1 can be coupled to the PC 4 via a USB (Universal Serial Bus) cable, an HDMI (High Definition Multimedia Interface) cable, or a VGA (Video Graphics Array) cable. USB is a registered trademark. HDMI is a registered trademark.

The projector 1 receives image data from the PC 4. The PC 4 is an example of an image data provision device. The image data provision device is not limited to the PC 4. For example, the image data provision device can be a DVD (Digital Versatile Disc) player. DVD is a registered trademark. It is possible for the projector 1 to read the image data from a recording medium such as a USB memory to thereby receive the image data. The image data represents an advertisement. It is possible for the image data to represent information different from the advertisement such as a material for a presentation.

The projector 1 projects the image generated by a liquid crystal light valve 12 described later, specifically, the image represented by the image data, from a projection section 104 toward a projection surface 5a.

Hereinafter, the image generated by the liquid crystal light valve 12 is referred to as a "generation image." The image displayed on the projection surface 5a by the projector 1 projecting the generation image toward the projection surface 5a is referred to as a "projection image." The projection image can become an image in which a distortion based on the positional relationship between the projector 1 and the projection surface 5a occurs in the generation image. The projector 1 is capable of performing a keystone distortion correction for correcting the distortion of the projection image.

The color of the projection surface 5a is white. The color of the projection surface 5a is not limited to white. It should be noted that in order to make the projection image eye-friendly, it is desirable for the color of the projection surface 5a to be a color close to white, for example, light gray or cream. The projection surface 5a is a surface provided to a projecting board 5. The projection surface 5a is not limited to the surface provided to the projecting board 5. The projection surface 5a can be, for example, a screen, a wall, a blackboard, a whiteboard, or a door. The projecting board 5 is supported by a second support device 6 installed on the ceiling 2. The second support device 6 can be installed on a wall or the like instead of the ceiling 2.

On the projection surface 5a, there are disposed the first object 7a, the second object 7b, the third object 7c, and the fourth object 7d. The first object 7a, the second object 7b, the third object 7c, and the fourth object 7d are the same in size as each other. The first object 7a, the second object 7b, the third object 7c, and the fourth object 7b are not required to be the same in size as each other, but can also be made different from each other so as to be the same in size as each other on the imaging data generated by an imaging section 106 described later.

Hereinafter, when there is no need to distinguish the first object 7a, the second object 7b, the third object 7c, and the fourth object 7d from each other, the first object 7a, the second object 7b, the third object 7c, and the fourth object 7d are each referred to as an "object 7."

The object 7 sets a projection area 8e in the projection surface 5a. The projection area 8e is, for example, an area in which the image based on the image data received from the PC 4 is to be projected. The projection surface 5a is an example of a first projection area. The projection area 8e is an example of a second projection area.

The shape of the projection area 8e is a quadrangular shape. The four corners of the projection area 8e are set based on the positions of the four objects 7. In the present embodiment, the positions of the four objects 7 constitute the four corners of the projection area 8e. When the four objects 7 are disposed on the four corners of the projection surface 5a, the whole of the projection surface 5a constitutes the projection area 8e.

The object 7 is a recursive reflector. The object 7 reflects most of the incident light toward an opposite direction to the incident direction of the light.

The projector 1 projects predetermined light such as white image light to the object 7 from the projection section 104. The projector 1 images the light reflected by the object 7 with the imaging section 106 to thereby generate imaging data. The projector 1 identifies the position of the object 7 based on the imaging data to decide the projection area 8e based on the position of the object 7.

The projector 1 projects a guide image E1, a projection position detecting image E2, an object detecting image E3, and a display image E4 on the projection surface 5a at respective timings different from each other.

The guide image E1 shows the area in which the object 7 is to be disposed. The area in which the object 7 is to be disposed is an example of a first area.

The projection position detecting image E2 represents a plurality of dots to be a target of projection position detection. The projection position detecting image E2 is used for a calibration of making a camera coordinate system correspond to a liquid crystal panel coordinate system. The camera coordinate system is a coordinate system to be applied to the imaging section 106, furthermore, a coordinate system to be applied to a taken image represented by the imaging data. The liquid crystal panel coordinate system is a coordinate system to be applied to the liquid crystal valve 12. In the calibration, there is generated a projective transformation matrix for making the camera coordinate system correspond to the liquid crystal panel coordinate system.

The object detecting image E3 is projected on the projection surface 5a in order to detect the object 7. The object detecting image E3 includes predetermined light such as white image light to be projected on the object 7. The object detecting image E3 is an example of a first image.

The display image E4 is an image to be projected in the projection area 8e. The display image E4 is, for example, an image based on the image data received from the PC 4. The display image E4 is projected after projection of the object detecting image E3. The display image E4 is an example of a second image.

A2. Projector 1

Figure 2:
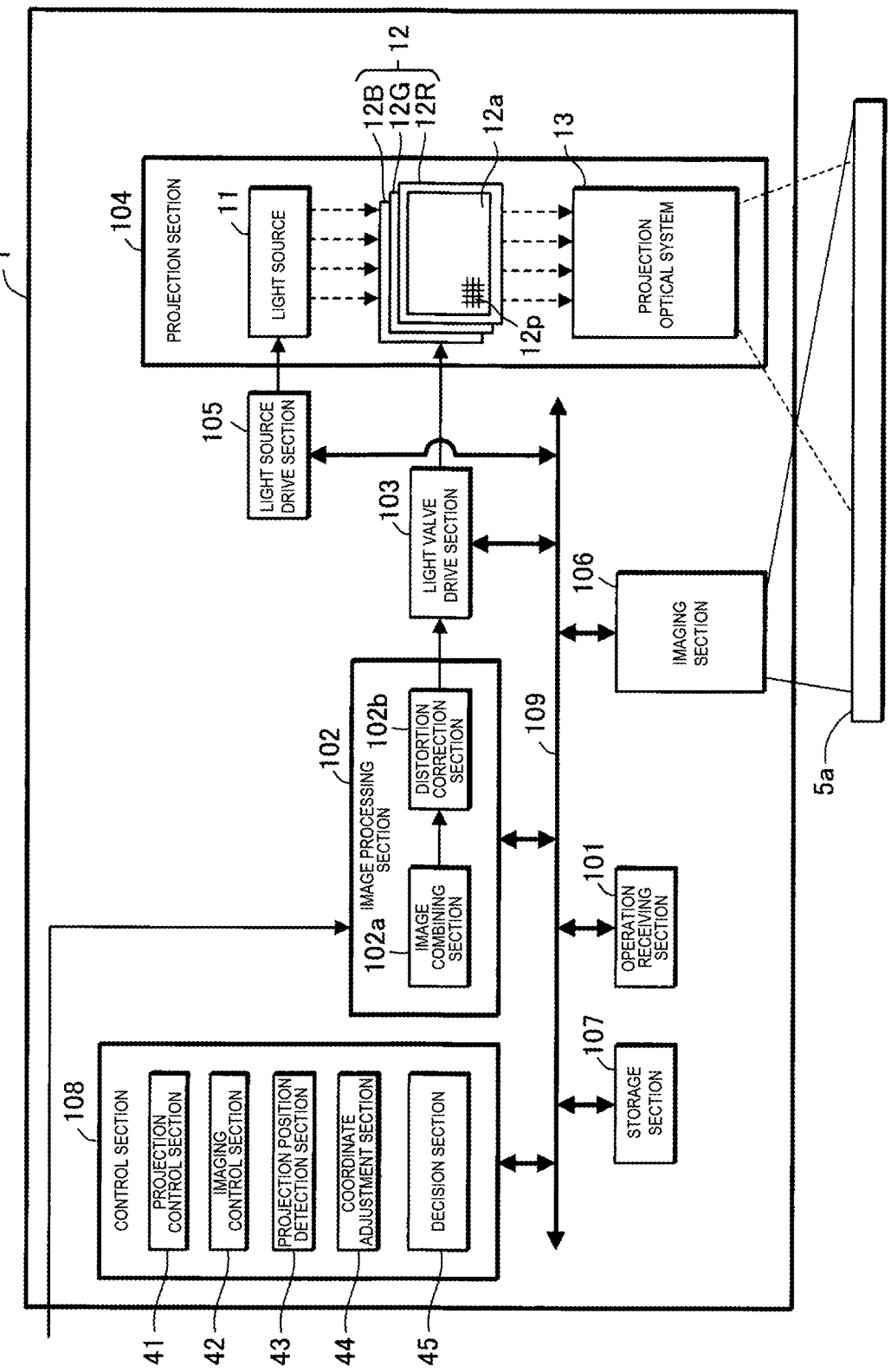
FIG. 2 is a diagram schematically showing a projector.

FIG. 2 is a diagram schematically showing the projector 1. The projector 1 includes an operation receiving section 101, an image processing section 102, a light valve drive section 103, a projection section 104, a light source drive section 105, the imaging section 106, a storage section 107, a control section 108, and a bus 109. The image processing section 102 includes an image combining section 102a and a distortion correction section 102b. The projection section 104 includes a light source 11, a red-color liquid crystal light valve 12R, a green-color liquid crystal light valve 12G, a blue-color liquid crystal light valve 12B, and a projection optical system 13.

Hereinafter, when there is no need to distinguish the red-color liquid crystal light valve 12R, the green-color liquid crystal light valve 12G, and the blue-color liquid crystal light valve 12B from each other, the red-color liquid crystal light valve 12R, the green-color liquid crystal light valve 12G, and the blue-color liquid crystal light valve 12B are each referred to as a "liquid crystal light valve 12."

The operation receiving section 101 is, for example, a variety of operation buttons, operation keys, or a touch panel. The operation receiving section 101 receives an input operation of the user. The operation receiving section 101 can also be a remote controller for transmitting the information based on the input operation wirelessly or with wire. In this case, the projector 1 includes a receiving section for receiving the information from the remote controller. The remote controller is provided with a variety of operation buttons, operation keys, or a touch panel for receiving the input operation. It is possible for the operation receiving section 101 to wirelessly receive the operation input to an application operating in an information terminal device such as a smartphone from the information terminal device.

The image processing section 102 is formed of a circuit such as a single image processor or two or more image processors. The image processing section 102 performs image processing on the image data to thereby generate the image signal. For example, the image processing section 102 performs image processing such as a gamma correction on the image data received from the PC 4 to thereby generate the image signal. The image data which is received by the image processing section 102 from other equipment is hereinafter referred to as "reception image data."

The image combining section 102a is constituted by, for example, an image combining circuit. The image combining section 102a combines a plurality of image data with each other, or outputs single image data. The image combining section 102a outputs guide image data, projection position detecting image data, object detecting image data, and reception image data at respective timings different from each other.

The guide image data represents the guide image E1. The projection position detecting image data represents the projection position detecting image E2. The object detecting image data represents the object detecting image E3. The reception image data represents the display image E4.

It should be understood that the guide image data, the projection position detecting image data, the object detecting image data, and the reception image data are each image data.

The distortion correction section 102b is constituted by, for example, a distortion correction circuit. The distortion correction section 102b performs the keystone distortion correction on the image data output by the image combining section 102a to thereby generate the image signal. The keystone distortion correction is processing of adjusting the area in which the generation image is generated in the liquid crystal light valve 12 so that the display image E4 is projected only in the projection area 8e.

The light valve drive section 103 is constituted by a circuit such as a single driver or two or more drivers. The light valve drive section 103 generates drive voltages based on the image signal. The light valve drive section 103 drives the liquid crystal light valves 12, specifically, the red-color liquid crystal light valve 12R, the green-color liquid crystal light valve 12G, and the blue-color liquid crystal light valve 12B using the drive voltages.

The projection section 104 emits the generation image toward the projection surface 5a to thereby project the projection image on the projection surface 5a. For example, the projection section 104 projects the projection image on the projection surface 5a on which the object 7 is located. The projection section 104 is an example of a projection device.

The light source 11 is an LED (Light Emitting Diode). The light source 11 is not limited to the LED, but can also be, for example, a xenon lamp, a super-high pressure mercury lamp, or a laser source. The light source 11 emits the light. The light emitted from the light source 11 enters an integrator optical system not shown. The integrator optical system reduces the unevenness in luminance distribution in the incident light. The light emitted from the light source 11 passes through the integrator optical system, and is then separated by a color separation optical system not shown into colored light components of red, green, and blue as the three primary colors of light. The red colored light component enters the red-color liquid crystal light valve 12R. The green colored light component enters the green-color liquid crystal light valve 12G. The blue colored light component enters the blue-color liquid crystal light valve 12B.

The liquid crystal light valves 12 are each formed of a liquid crystal panel having a liquid crystal material existing between a pair of transparent substrates, and so on. The liquid crystal light valves 12 each have a rectangular pixel area 12a. The pixel area 12a includes a plurality of pixels 12p arranged in a matrix. In each of the liquid crystal light valves 12, the drive voltage is applied to the liquid crystal for each of the pixels 12p. When the light valve drive section 103 applies the drive voltages to the respective pixels 12p, the light transmittance of each of the pixels 12p is set to the light transmittance based on the drive voltage. The light emitted from the light source 11 passes through the pixel area 12a to thereby be modulated. Therefore, the image based on the drive voltages is formed for each colored light. The liquid crystal light valves 12 are an example of a light modulation device.

The images of the respective colors are combined by a color combining optical system not shown for each of the pixels 12p. Therefore, a color image is generated. The color image is projected on the projection surface 5a via the projection optical system 13.

The light source drive section 105 drives the light source 11. For example, when the operation receiving section 101 has received the operation input of powering-ON, the light source drive section 105 makes the light source 11 emit light.

The imaging section 106 is, for example, a camera. The imaging section 106 takes an image of the projection surface 5a to thereby generate the imaging data. The imaging section 106 includes an optical system such as a lens, and an imaging element for converting the light collected by the optical system into an electric signal. The imaging element is, for example, a CCD (Charge Coupled Device) image sensor, or a CMOS (Complementary Metal Oxide Semiconductor) image sensor.

The imaging section 106 can be disposed as a separate member from the projector 1. In this case, the imaging section 106 and the projector 1 are coupled to each other with a wired or wireless interface so as to be able to perform transmission/reception of data. The imaging section 106 is an example of an imaging device.

The storage section 107 is a computer-readable recording medium. The storage section 107 stores a program for defining the operation of the projector 1, and a variety of types of information.

The control section 108 is constituted by, for example, a single processor or two or more processors. Citing an example, the control section 108 is constituted by a signal CPU (Central Processing Unit) or two or more CPUs. Some or all of the functions of the control section 108 can also be realized by a circuit such as a DSP (Digital Signal Processor), an ASIC (Application Specific Integrated Circuit), a PLD (Programmable Logic Device), or an FPGA (Field Programmable Gate Array). The control section 108 is an example of a control device.

The control section 108 reads a program stored by the storage section 107. The control section 108 executes the program to thereby realize a projection control section 41, an imaging control section 42, a projection position detection section 43, a coordinate adjustment section 44, and a decision section 45.

The projection control section 41 controls the image processing section 102 and the light source drive section 105 to thereby control the projection image. The projection control section 41 can be formed of a circuit such as a single projection controller or two or more projection controllers.

The imaging control section 42 controls the imaging section 106 to thereby make the imaging section 106 generate the imaging data. The imaging control section 42 can be formed of a circuit such as a single imaging controller or two or more imaging controllers.

The projection position detection section 43 detects the positions of the plurality of dots represented by the projection position detecting image E2 based on the imaging data generated by the imaging section 106 imaging the projection surface 5a on which the projection position detecting image E2 is projected. The detection result represents the positions of the plurality of dots in the camera coordinate system. The projection position detection section 43 can be formed of a circuit such as a projection position detection circuit.

The coordinate adjustment section 44 generates the projective transformation matrix using the positions of the plurality of dots in the camera coordinate system and the positions of the plurality of dots in the liquid crystal panel coordinate system. The coordinate adjustment section 44 stores the projective transformation matrix in the storage section 107. The coordinate adjustment section 44 can be formed of a circuit such as a coordinate adjustment circuit.

In the camera coordinate system, when the distortion of the lens provided to the imaging section 106 affects the positions of the plurality of dots, it is possible for the coordinate adjustment section 44 to correct the camera coordinate system based on the influence of the distortion of the lens in the imaging section 106 to thereby generate a standard coordinate system. In this case, the coordinate adjustment section 44 identifies the positions of the plurality of dots in the standard coordinate system. The coordinate adjustment section 44 generates the projective transformation matrix using the positions of the plurality of dots in the liquid crystal light valve 12 to which the liquid crystal panel coordinate system is applied, and the positions of the plurality of dots in the standard coordinate system.

The decision section 45 identifies the position of the object 7 based on the imaging data generated by the imaging section 106 imaging the projection surface 5a on which the object detecting image E3 is projected.

For example, the decision section 45 first identifies a high luminance area representing the object 7 from the taken image. The high luminance area is an area having the luminance no lower than comparative luminance obtained by making the luminance of an adjacent part 1.5 times in the taken image. The value 1.5 is an example of a threshold value. The threshold value is not limited to 1.5, but can be a value greater than 1.5, or can also be a value in a range greater than 1.0 and smaller than 1.5. Further, it is possible for the decision section 45 to multiply the peak of the luminance in the taken image by a predetermined coefficient to thereby generate a reference value. In this case, it is possible for the decision section 45 to identify the area having the luminance no lower than the reference value in the taken image as the high luminance area. The predetermined coefficient is, for example, 0.5.

Subsequently, when an area surrounded by the high luminance area exists in the taken image, the decision section 45 decides an area identified by adding the high luminance area to the area surrounded by the high luminance area as an object area where the object 7 exists. Further, it is possible for the decision section 45 to decide an area where the luminance exceeds a predetermined threshold value in the taken image as the object area where the object 7 exists.

Subsequently, the decision section 45 identifies the position of the object 7 based on the object area. Subsequently, the decision section 45 decides the projection area 8e based on the position of the object 7. It is possible for the decision section 45 to be formed of a circuit such as a decision circuit.

The bas 109 is coupled to each of the operation receiving section 101, the image processing section 102, the light valve drive section 103, the light source drive section 105, the imaging section 106, the storage section 107, and the control section 108.

A3. Keystone Distortion Correction

Figure 3:
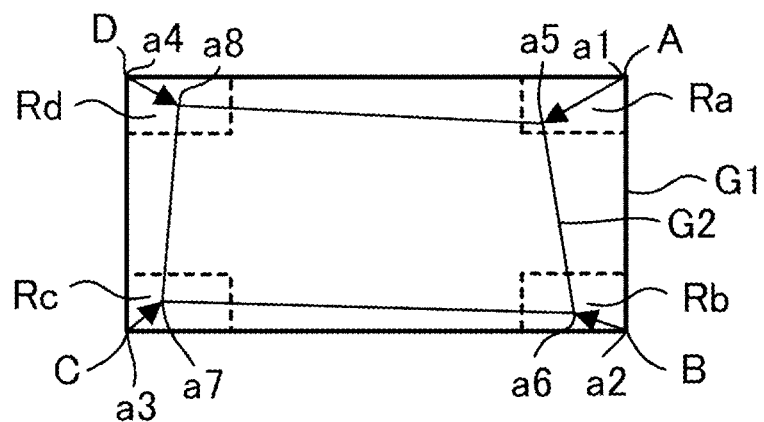
FIG. 3 is a diagram for explaining an example of a keystone distortion correction.

FIG. 3 is a diagram for explaining an example of the keystone distortion correction. Specifically, FIG. 3 is a diagram for explaining a method of correcting the generation image to be generated in the liquid crystal light valve 12.

A first image G1 represented by the image data has a first corner A, a second corner B, a third corner C, and a fourth corner D. The first corner A, the second corner B, the third corner C, and the fourth corner D constitute the four corners of the first image G1.

The distortion correction section 102b individually moves each of the first corner A, the second corner B, the third corner C, and the fourth corner D in accordance with the operation input received by the operation receiving section 101 to thereby perform the keystone distortion correction. The distortion correction section 102b performs the keystone distortion correction to thereby generate a second image G2. The first image G1 and the second image G2 are each an example of the generation image.

In the example shown in FIG. 3, the distortion correction section 102b moves the first corner A from a first position a1 to a fifth position a5, moves the second corner B from a second position a2 to a sixth position a6, moves the third corner C from a third position a3 to a seventh position a7, and moves the fourth corner D from a fourth position a4 to an eighth position a8.

In FIG. 3, there are shown a first range Ra, a second range Rb, a third range Rc, and a fourth range Rd. The first range Ra is a range in which the first corner A can move in accordance with the keystone distortion correction. The distortion correction section 102b moves the first corner A within the first range Ra. The second range Rb is a range in which the second corner B can move in accordance with the keystone distortion correction. The distortion correction section 102b moves the second corner B within the second range Rb. The third range Rc is a range in which the third corner C can move in accordance with the keystone distortion correction. The distortion correction section 102b moves the third corner C within the third range Rc. The fourth range Rd is a range in which the fourth corner D can move in accordance with the keystone distortion correction. The distortion correction section 102b moves the fourth corner D within the fourth range Rd.

A4. Example of Generation Image

Then, an example of the generation image as each of the guide image E1, the projection position detecting image E2, and the object detecting image E3 will be described.

A4-1. Generation Image as Guide Image E1

Figure 4:
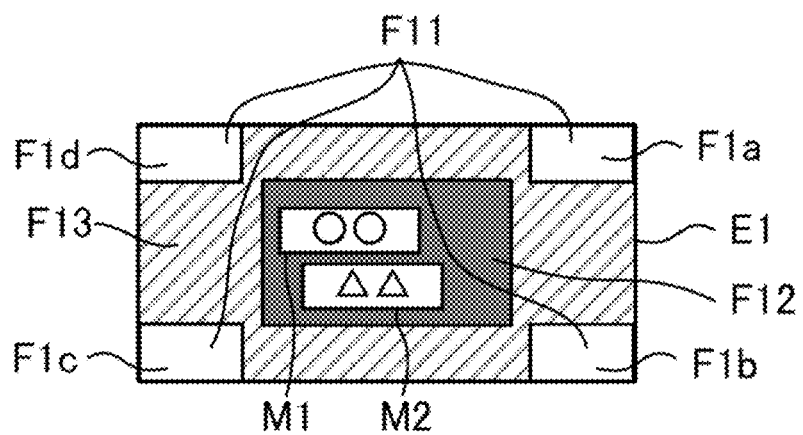
FIG. 4 is a diagram showing an example of a generation image as a guide image.

FIG. 4 is a diagram showing an example of the guide image E1 represented by the guide image data. In other words, FIG. 4 is a diagram showing an example of a generation image based on the guide image data. The guide image E1 has first guide areas F11 and a second guide area F12. The guide image E1 includes a first background F13 represented by hatching in FIG. 4. The color of the first background F13 is black. The color of the first background F13 is not limited to black, but is sufficiently a color different from at least the color of the first guide areas F11. It is possible for the color of the first background F13 to be different from either of the color of the first guide areas F11 and the color of the second guide area F12.

The first guide areas F11 represent ranges in which the first corner A, the second corner B, the third corner C, and the fourth corner D can move, respectively, in accordance with the keystone distortion correction. The color of the first guide areas F11 is white. The color of the first guide areas F11 is not limited to white, but can be, for example, yellow.

The first guide areas F11 include an upper right area F1a, a lower right area F1b, a lower left area F1c, and an upper left area F1d. The upper right area F1a represents a range in which the first corner A can move in accordance with the keystone distortion correction. The lower right area F1b represents a range in which the second corner B can move in accordance with the keystone distortion correction. The lower left area F1c represents a range in which the third corner C can move in accordance with the keystone distortion correction. The upper left area F1d represents a range in which the fourth corner D can move in accordance with the keystone distortion correction.

The positional relationship between the upper right area F1a, the lower right area F1b, the lower left area F1c, and the upper left area F1d is substantially the same as the positional relationship between the first range Ra through the fourth range Rd shown in FIG. 3.

The shape of each of the upper right area F1a, the lower right area F1b, the lower left area F1c, and the upper left F1d is a rectangular shape. The shape of each of the upper right area F1a, the lower right area F1b, the lower left area F1c, and the upper left F1d can be different from the rectangular shape.

The second guide area F12 represents an area where the plurality of dots shown in the projection position detecting image E2 is projected. The color of the second guide area F12 is white. The color of the second guide area F12 is not limited to white, but can be, for example, yellow. The shape of the second guide area F12 is a rectangular shape. The shape of the second guide area F12 can be different from the rectangular shape.

The guide image E1 represents a first message M1. The first message M1 encourages to adjust both or one of the position of the guide image E1 and the position of the object 7 so that the object 7 is located in the first guide area F11 displayed on the projection surface 5a.

The first message M1 represents the words such as "please adjust the projection position so that the object falls within the white areas on the four corners of the projection area." The first message M1 can arbitrarily be changed as long as the first message M1 encourages to locate the object 7 in the first guide area F11. The first message M1 can be shown in the second guide area F12, or can also be shown in the first background F13.

The guide image E1 further represents a second message M2. The second message M2 encourages to locate the second guide area F12 in the projection area 8e. When the shape of the second guide area F12 is a rectangular shape, the second message M2 represents the words such as "please adjust the projection position so that the rectangular area at the center of the projection image falls within the projection surface." The second message M2 can arbitrarily be changed as long as the second message M2 encourages to locate the second guide area F12 in the projection area 8e. The second message M2 can be shown in the second guide area F12, or can also be shown in the first background F13. The guide image E1 can represent only either one of the first message M1 and the second message M2, or can also represent both of the first message M1 and the second message M2.

A4-2. Generation Image as Projection Position Detecting Image E2

Figure 5:
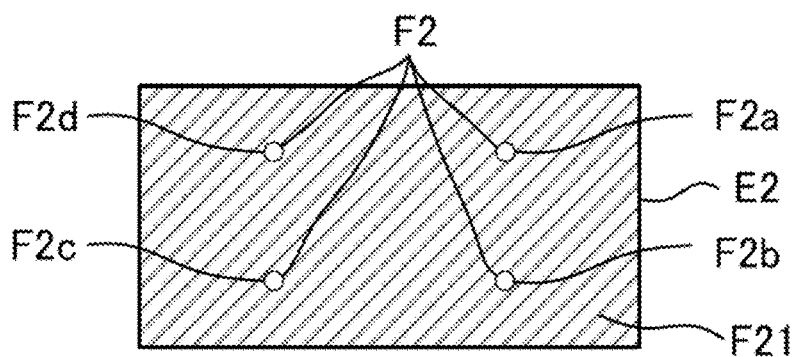
FIG. 5 is a diagram showing an example of a generation image as a projection position detecting image.

FIG. 5 is a diagram showing an example of the projection position detecting image E2 represented by the projection position detecting image data. Specifically, FIG. 5 is a diagram showing an example of a generation image based on the projection position detecting image data.

The projection position detecting image E2 has a projection position detecting pattern F2. The projection position detecting pattern F2 has white dots F2a through F2d shown in a second background F21 having a black color. The color of the second background F21 is not limited to black, but is sufficiently a color different from the color of the dots F2a through F2d. The color of the dots F2a through F2d is not limited to white, but is sufficiently a color different from the color of the second background F21. The dots F2a through F2d are used for generating the projective transformation matrix. The luminance distribution in each of the dots F2a through F2d is, for example, a Gaussian distribution. The luminance distribution of the dot is not limited to a luminance distribution having a gradation characteristic such as a Gaussian distribution, but can be a luminance distribution not having the gradation characteristic. It is possible to use marks each having a polygonal shape such as a rectangular shape or a hexagonal shape instead of the dots F2a through F2d.

A4-3. Generation Image as Object Detecting Image E3

Figure 6:
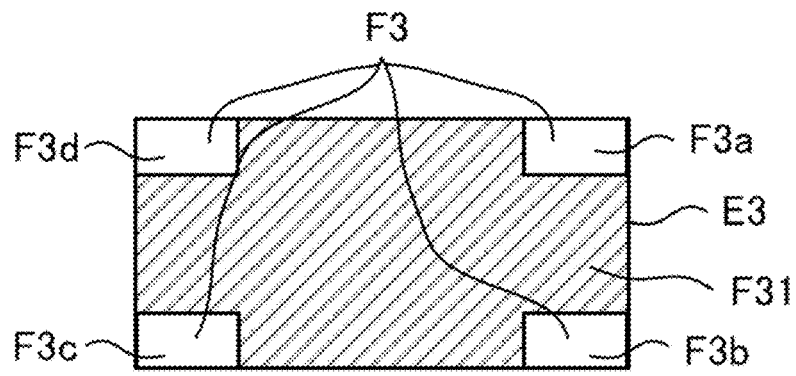
FIG. 6 is a diagram showing an example of a generation image as an object detecting image.

FIG. 6 is a diagram showing an example of the object detecting image E3 represented by the object detecting image data. In other words, FIG. 6 is a diagram showing an example of a generation image based on the object detecting image data.

The object detecting image E3 has an object detecting pattern F3. The object detecting pattern F3 has patterns F3a through F3d each having a white color shown in a third background F31 having a black color. The patterns F3a through F3d each having a white color are constituted by white light.

The color of the third background F31 is not limited to black, but is sufficiently a color different from the color of the patterns F3a through F3d. The color of the patterns F3a through F3d is not limited to white, but is sufficiently a color different from the color of the third background F31. The color of the patterns F3a through F3d can be the same as, or can also be different from, the color of the upper right area F1a, the lower right area F1b, the lower left area F1c, and the upper left area F1d shown in FIG. 4.

The color of the patterns F3a through F3d is preferably the same as the color of the dots F2a through F2d shown in FIG. 5. When the distortion of the lens provided to the imaging section 106 is corrected in the camera coordinate system, it is desirable for the color of the dots F2a through F2d to be a color approximate to a wavelength component of a parameter used when correcting the distortion of the lens provided to the imaging section 106. In this case, it is desirable for the color of the dots F2a through F2d and the color of the patterns F3a through F3d to be, for example, green instead of white. The light constituting the patterns F3a through F3d can be referred to as predetermined light. The white light constituting the patterns F3a through F3d is an example of the predetermined light. In order to make the detection of the object 7 easy, it is desirable for the predetermined light to be light having a single color.

The positional relationship between the patterns F3a through F3d is substantially the same as the positional relationship between the first range Ra through the fourth range Rd shown in FIG. 3. Therefore, when the positions of the guide image E1 and the object 7 are set in accordance with the guide image E1, the first object 7a is irradiated with a part of the pattern F3a, the second object 7b is irradiated with a part of the pattern F3b, the third object 7c is irradiated with a part of the pattern F3c, and the fourth object 7d is irradiated with a part of the pattern F3d.

The guide image data, the projection position detecting image data, and the object detecting image data are stored in advance in the storage section 107. The guide image data, the projection position detecting image data, and the object detecting image data can be generated by the control section 108 without being stored in advance in the storage section 107.

A5. Example of Projection Image

Then, an example of the projection image as each of the guide image E1, the projection position detecting image E2, and the object detecting image E3 will be described.

A5-1. Projection Image as Guide Image E1

Figure 7:
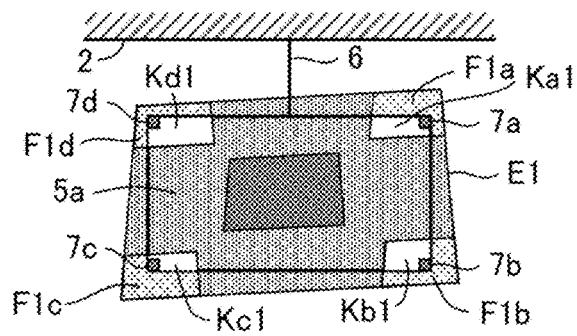
FIG. 7 is a diagram showing an example of a projection image as the guide image.

FIG. 7 is a diagram showing an example of the projection image as the guide image E1. In FIG. 7, a keystone distortion occurs in the guide image E1 due to the relative positional relationship between the projector 1 and the projection surface 5a, and so on.

A5-2. Projection Image as Projection Position Detecting Image E2

Figure 8:
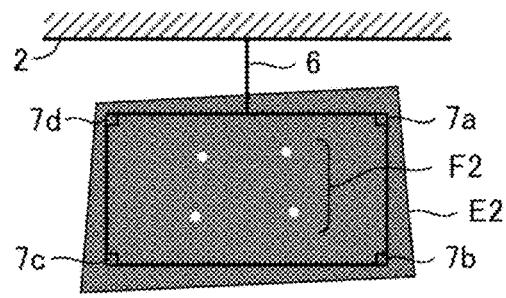
FIG. 8 is a diagram showing an example of a projection image as the projection position detecting image.

FIG. 8 is a diagram showing an example of the projection image as the projection position detecting image E2. In FIG. 8, a keystone distortion occurs in the projection position detecting image E2 due to the relative positional relationship between the projector 1 and the projection surface 5a, and so on.

A5-3. Projection Image as Object Detecting Image E3

Figure 9:
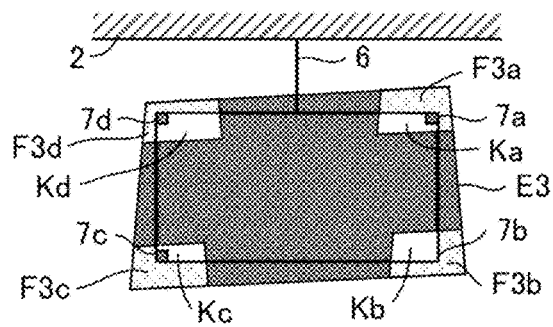
FIG. 9 is a diagram showing an example of a projection image as the object detecting image.

FIG. 9 is a diagram showing an example of the projection image as the object detecting image E3. In FIG. 9, a keystone distortion occurs in the object detecting image E3 due to the relative positional relationship between the projector 1 and the projection surface 5a, and so on. An area Ka irradiated with the pattern F3a out of the projection surface 5a, an area Kb irradiated with the pattern F3b out of the projection surface 5a, an area Kc irradiated with the pattern F3c out of the projection surface 5a, and an area Kd irradiated with the pattern F3d out of the projection surface 5a are each an example of the first area. It should be noted that in FIG. 7, there are shown areas Ka1 through Kd1 each functioning as the first area.

A6. Configuration of Projector 1

Then, a configuration of the projector 1 will be described. Even in the situation in which the object 7 located on the projection surface 5a is irradiated with a part of the object detecting pattern F3, when the imaging section 106 is located at a position where the imaging section 106 cannot receive light of a part of the object detecting pattern F3 reflected by the object 7, the imaging data generated by the imaging section 106 fails to represent the object 7. In this case, the decision section 45 cannot identify the position of the object 7 based on the imaging data.

Further, even in a situation in which the imaging section 106 receives the light of the part of the object detecting pattern F3 reflected by the object 7, when the high luminance area representing the object 7 does not exist in the taken image, the decision section 45 cannot identify the position of the object 7 based on the imaging data. Here, the high luminance area is an area having the luminance no lower than comparative luminance obtained by making the luminance of an adjacent part 1.5 times in the taken image.

Therefore, the projection section 104 and the imaging section 106 are disposed so that the value obtained by dividing the luminance of the object 7 represented by the imaging data by the luminance of the projection surface 5a represented by the imaging data becomes no lower than 1.5 as a threshold value. In other words, the projection section 104 and the imaging section 106 are disposed so that the result of the division becomes no lower than 1.5 irrespective of the position of the object 7 on the projection surface 5a.

Specifically, the user adjusts the position of the projector 1 and the posture of the projector 1 to thereby dispose the projection section 104 and the imaging section 106 so that a contrast ratio between the object and the periphery becomes no lower than 1.5. It should be understood that the periphery means the periphery of the object. In other words, the user disposes the projection section 104 and the imaging section 106 so that the contrast ratio between the object represented by the imaging data and the periphery represented by the imaging data becomes no lower than 1.5.

Figure 12:
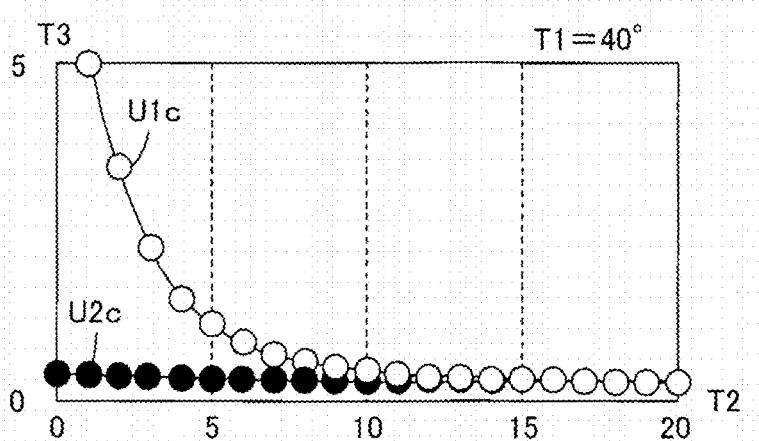
FIG. 12 is a diagram showing the reflection characteristics of light when the incident angle of the light is 40°.
Figure 13:
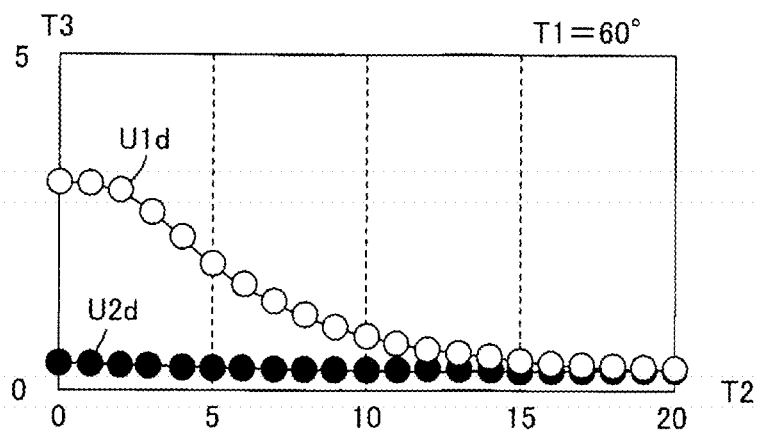
FIG. 13 is a diagram showing the reflection characteristics of light when the incident angle of the light is 60°.
Figure 14:
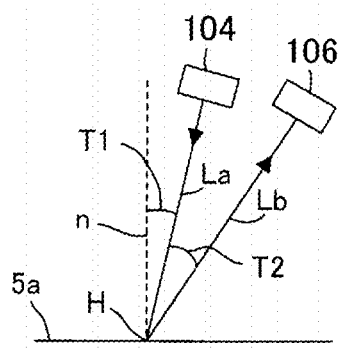
FIG. 14 is a diagram for explaining the incident angle and a reflection angle.

Here, the reflection characteristics of the object 7 and the projection surface 5a will be described. FIG. 10 through FIG. 13 are each a diagram showing reflection characteristics U1 of the light in the object 7, and reflection characteristics U2 of the light in the projection surface 5a high in light scattering characteristic. The projection surface 5a high in light scattering characteristic is, for example, a mat screen. In FIG. 10 through FIG. 13, the horizontal axis represents an observation angle T2, and the vertical axis represents reflection intensity T3. In FIG. 10 through FIG. 13, an incident angle T1 is 0°, 20°, 40°, 60°, respectively. FIG. 14 is an explanatory diagram with respect to the incident angle T1 and the observation angle T2 corresponding to the disposition of the projection section 104 and the imaging section 106. The incident angle T1 is an angle formed between a straight line La passing through an observation point H and the projection section 104, and a normal line n of the projection surface 5a. The observation angle T2 is an angle formed between a straight line Lb passing through the observation point H and the imaging section 106, and the straight line La. The fact that the light scattering characteristic is high means that the reflection intensity T3 when the observation angle T2 is 0° is substantially constant even when the incident angle T1 changes from 0° to 60°.

Figure 10:
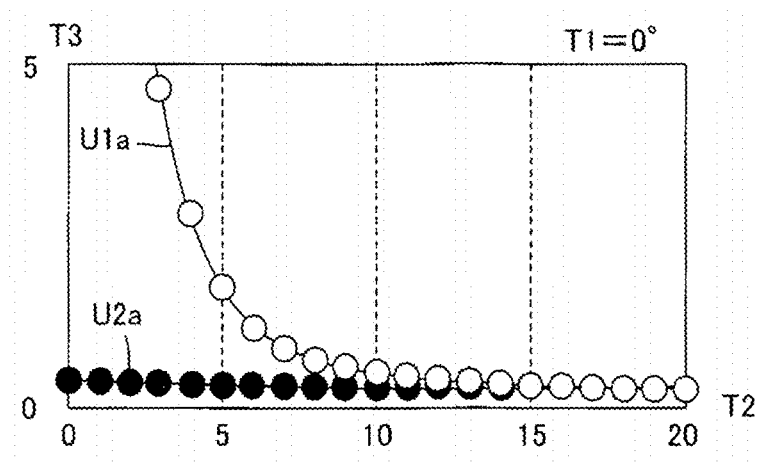
FIG. 10 is a diagram showing reflection characteristics of light when an incident angle of the light is 0°.
Figure 11:
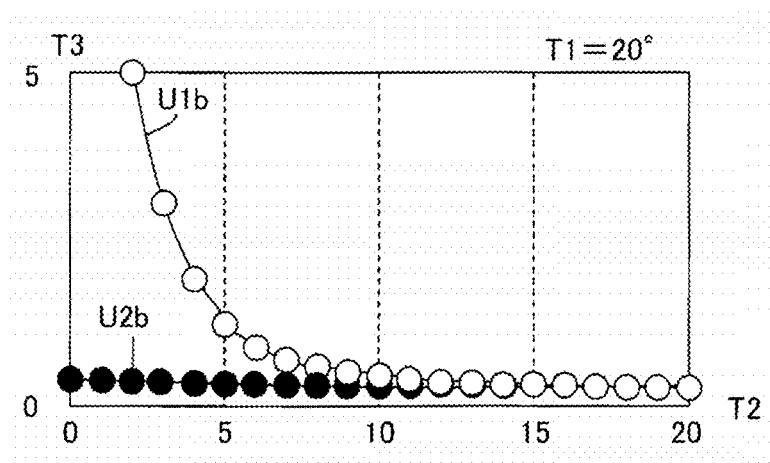
FIG. 11 is a diagram showing reflection characteristics of light when the incident angle of the light is 20°.

FIG. 10 shows the reflection characteristics U1a of light in the object 7 when the incident angle T1 of the light is 0°, and the reflection characteristics U2a of light in the projection surface 5a when the incident angle T1 of the light is 0°. FIG. 11 shows the reflection characteristics U1b of light in the object 7 when the incident angle T1 of the light is 20°, and the reflection characteristics U2b of light in the projection surface 5a when the incident angle T1 of the light is 20°. FIG. 12 shows the reflection characteristics U1c of light in the object 7 when the incident angle T1 of the light is 40°, and the reflection characteristics U2c of light in the projection surface 5a when the incident angle T1 of the light is 40°. FIG. 13 shows the reflection characteristics U1d of light in the object 7 when the incident angle T1 of the light is 60°, and the reflection characteristics U2d of light in the projection surface 5a when the incident angle T1 of the light is 60°.

As shown in FIG. 10 through FIG. 13, when the projection surface 5a high in light scattering characteristic is used, the reflection intensity T3 of the object 7 becomes higher than the reflection intensity obtained by making the reflection intensity T3 of the projection surface 5a 1.5 times irrespective of the incident angle T1 as long as the observation angle T2 is no smaller than 0° and no larger than 10°. The reflection intensity T3 is proportional to the luminance in the imaging data. Therefore, when the observation angle T2 is no smaller than 0° and no larger than 10°, the high luminance area exists in the taken image. Therefore, when the observation angle T2 is no smaller than 0° and no larger than 10°, it is possible for the decision section 45 to identify the position of the object 7 based on the imaging data.

Figure 15:
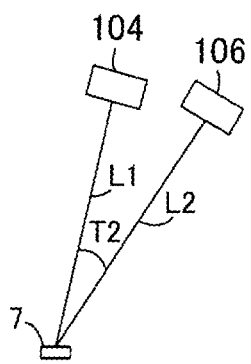
FIG. 15 is a diagram for explaining an angle formed between a first straight line and a second straight line.

Therefore, when the projection surface 5a high in light scattering characteristic is used, the user dispose the projection section 104 and the imaging section 106 so that the angle T2 formed between a first straight line L1 passing through the object 7 and the projection section 104, and a second straight line L2 passing through the object 7 and the imaging section 106 is within a range no smaller than 0° and no larger than 10° irrespective of the position of the object 7 in the projection surface 5a as illustrated in FIG. 15. The range no smaller than 0° and no larger than 10° is an example of a predetermined angular range.

The first straight line L1 is a straight line passing through the centroid of the object 7 and a principal point of the projection optical system in the projection section 104. The principal point of the projection optical system 13 is a principal point of a lens constituting the projection optical system 13. The first straight line L1 is not limited to the straight line passing through the centroid of the object 7 and the principal point of the projection optical system 13, but can also be, for example, a straight line passing through a point the closest to the projection optical system 13 in an outer surface of the object 7 and the principal point of the projection optical system 13.

The second straight line L2 is a straight line passing through the centroid of the object 7 and a principal point of an optical system such as a lens in the imaging section 106. The second straight line L2 is not limited to the straight line passing through the centroid of the object 7 and the principal point of the optical system such as the lens in the imaging section 106, but can also be, for example, a straight line passing through a point the closest to the imaging section 106 in the outer surface of the object 7 and the principal point of the optical system such as the lens in the imaging section 106.

The angle T2 formed between the first straight line L1 and the second straight line L2 means the observation angle T2. The shorter the distance between the projector 1 and the projection surface 5a is, the larger the observation angle T2 becomes. Therefore, the user adjusts the distance between the projector 1 and the projection surface 5a to thereby set the observation angle T2 within the range no smaller than 0° and no larger than 10°.

Further, the longer the distance between the projection section 104 and the imaging section 106 is, the larger the observation angle T2 becomes. Therefore, when the distance between the projection section 104 and the imaging section 106 can be adjusted, for example, when there is adopted the configuration in which the imaging section 106 is separated from the projector 1, the user adjusts the distance between the projection section 104 and the imaging section 106 to thereby set the observation angle 12 within the range no smaller than 0° and no larger than 10°. It should be noted that the range no smaller than 0° and no larger than 10° can arbitrarily be changed in accordance with the reflection characteristics of light by the object 7 and the degree of the light scattering characteristic in the projection surface 5a.

When the projection section 104 and the imaging section 106 are disposed as described above, it is possible for the decision section 45 to identify the object 7 on the projection surface 5a irrespective of what position in the projection surface 5a high in light scattering characteristic the object 7 is disposed at.

A7. Operation of Projector 1

Figure 16:
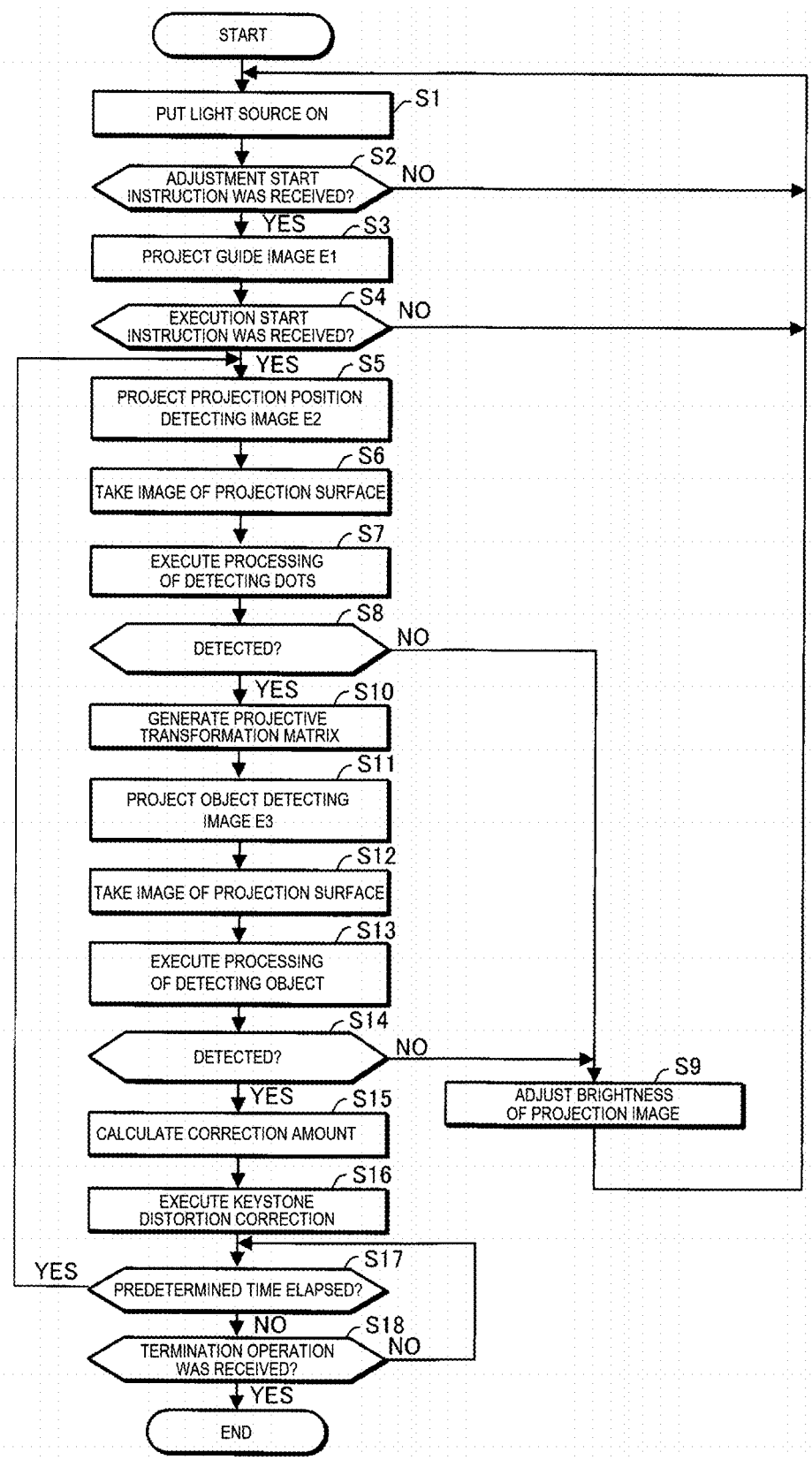
FIG. 16 is a flowchart for explaining an operation of the projector.

Then, an operation of the projector 1 disposed in such a manner as described above will be described. FIG. 16 is a flowchart for explaining the operation of the projector 1.

In order to set the projection area 8e in the projection surface 5a, the user disposes the object 7 on the projection surface 5a. For example, when setting the entire surface of the projection surface 5a as the projection area 8e, the user disposes the objects 7 on the four corners of the projection surface 5a one by one.

Subsequently, the user operates the operation receiving section 101 to thereby set the power of the projector 1 to an ON state. When the power of the projector 1 is set to the ON state, the projection control section 41 controls the light source drive section 105 to thereby put the light source 11 on in the step S1.

Subsequently, the user operates the operation receiving section 101 to input an adjustment start instruction of manually adjusting at least one of the posture of the projector 1, the position of the projector 1, and the position of the object 7.

When the operation receiving section 101 receives the adjustment start instruction in the step S2, the projection control section 41 reads the guide image data from the storage section 107. Subsequently, the projection control section 41 provides the guide image data to the image combining section 102a. Subsequently, the projection control section 41 sets the correction amount of the keystone distortion correction in the distortion correction section 102b to zero. The order of the processing of providing the image combining section 102a with the guide image data and the processing of setting the correction amount of the keystone distortion correction to be zero can be reversed. When the operation receiving section 101 fails to receive the adjustment start instruction within a specified period of time in the step S2, the process can return to the step S1, or can return to the head of the step S2, or can be terminated.

Subsequently, the image processing section 102 generates the image signal based on the guide image data. Subsequently, the image processing section 102 provides the image signal to the light valve drive section 103. The light valve drive section 103 generates the drive voltages based on the image signal. Subsequently, in the step S3, the projection section 104 projects the guide image E1 on the projection surface 5a in accordance with the drive voltages.

The user is prompted by the guide image E1, for example, prompted by the first message M1 and the second message M2, to manually adjust the posture of the projector 1, the position of the projector 1, or the position of the object 7. For example, the user manually adjusts the posture of the projector 1, the position of the projector 1, or the positions of the objects 7 so that the first object 7a is located in the area Ka1, the second object 7b is located in the area Kb1, the third object 7c is located in the area Kc1, the fourth object 7d is located in the area Kd1, and the second guide area F12 is located on the projection surface 5a.

When the user ends the manual adjustment according to the guide image E1, the user operates the operation receiving section 101 to thereby input an execution start instruction of starting an automatic adjustment of the shape of the projection image.

When the operation receiving section 101 receives the execution start instruction in the step S4, the projection control section 41 reads the projection position detecting image data from the storage section 107. Subsequently, the projection control section 41 provides the projection position detecting image data to the image combining section 102a. The image processing section 102 generates the image signal based on the projection position detecting image data. Subsequently, the image processing section 102 provides the image signal to the light valve drive section 103. The light valve drive section 103 generates the drive voltages based on the image signal. It should be noted that when the operation receiving section 101 fails to receive the execution start instruction within a predetermined period of time in the step S4, the process can return to the step S1, or can return to the head of the step S4, or can be terminated.

Subsequently, in the step S5, the projection section 104 projects the projection position detecting image E2 on the projection surface 5a in accordance with the drive voltages based on the projection position detecting image data.

Subsequently, in the step S6, the imaging control section 42 makes the imaging section 106 take an image of the projection surface 5a on which the projection position detecting image E2 is projected. The imaging section 106 takes an image of the projection surface 5a to thereby generate the imaging data.

In the step S6, the imaging control section 42 adjusts the exposure of the imaging section 106 so that, for example, a maximum luminance of the dots F2a through F2d represented by the imaging data falls within a predetermined luminance range, and then makes the imaging section 106 take the image of the projection surface 5a.

Subsequently, in the step S7, the projection position detection section 43 executes the processing of detecting the positions of the respective dots F2a through F2d in the taken image represented by the imaging data.

In the step S7, the projection position detection section 43 first identifies the lowest luminance value in the taken image. Subsequently, the projection position detection section 43 adds a dot judgment luminance value to the lowest luminance value to thereby calculate a dot judgment threshold value. The dot judgment luminance value is a luminance value to be used for a dot judgment. Subsequently, the projection position detection section 43 identifies a high luminance portion exhibiting the luminance higher than the dot judgment threshold value in the taken image. Subsequently, the projection position detection section 43 detects a corresponding-sized high luminance portion having a size within a size range no smaller than a first predetermined size and no larger than a second predetermined size out of the light luminance portion as the dots F2a through F2d. It should be noted that the second predetermined size is larger than the first predetermined size. The corresponding-sized high luminance portion is hereinafter referred to as a "dot part."

In the step S7, the projection position detection section 43 further detects the centroid positions of the respective dot parts as the positions of the dots F2a through F2d.

It is possible for the projection position detection section 43 to detect the centroid position of the dot part using a luminance distribution in the dot part. For example, the projection position detection section 43 weights each of the pixels constituting the dot part based on the luminance of the pixel to detects the centroid position in the dot part thus weighted.

It is possible for the projection position detection section 43 to detect the position of each of the dots F2a through F2d using a difference between the imaging data generated by the imaging section 106 which is set to the exposure value when generating dot imaging data in the situation in which the projection section 104 projects an entirely black image, and the dot imaging data. In this case, it becomes possible to prevent the environmental light from affecting the detection of the dots F2a through F2d.

Subsequently, when any of the dots F2a through F2d fail to be detected in the step S8, the projection control section 41 makes the brightness of the projection image darker than the present brightness in the step S9.

As the situation in which any of the dots F2a through F2d fail to be detected in the step S8, there can be assumed a situation in which, for example, the posture of the projector 1 has changed due to the own weight of the projector 1, and therefore, any of the dots F2a through F2d run off the projection surface 5a. In this situation, even when making the dots F2a through F2d bright, it is difficult to detect all of the dots F2a through F2d.

Therefore, when the brightness of the projection image when it is judged that the dots F2a through F2d are not detected is assumed as 100%, the projection control section 41 sets the brightness of the projection image to the brightness lower than 100% in the step S9. For example, in the step S9, the projection control section 41 sets the brightness of the projection image to the brightness of 30%. The brightness lower than 100% is not limited to the brightness of 30%. For example, the brightness lower than 100% can be the brightness of 0%. The brightness of 0% means to stop the projection of the projection image. It is possible for the projection control section 41 to make the projection image inconspicuous by making the projection image projected in a shifted state with respect to the projection image 5a dark. When the step S9 terminates, the process returns to the step S1.

In contrast, when the dots F2a through F2d are detected in the step S8, the coordinate adjustment section 44 calculates the projective transformation matrix for transforming the camera coordinate system into the liquid crystal panel coordinate system using the dots F2a through F2d in the step S10.

In the step S10, the coordinate adjustment section 44 first identifies the centroid coordinate in the liquid crystal panel coordinate system of each of the dots F2a through F2d based on the projection position detecting image data. Subsequently, the coordinate adjustment section 44 calculates the projective transformation matrix based on a positional relationship between the centroid coordinate in the liquid crystal panel coordinate system of each of the dots F2a through F2d, and the centroid coordinate in the camera coordinate system of each of the dots F2a through F2d. Subsequently, the coordinate adjustment section 44 stores the projective transformation matrix in the storage section 107.

Subsequently, the projection control section 41 reads the object detecting image data from the storage section 107. Subsequently, the projection control section 41 provides the object detecting image data to the image combining section 102a. The image processing section 102 generates the image signal based on the object detecting image data. Subsequently, the image processing section 102 provides the image signal to the light valve drive section 103. The light valve drive section 103 generates the drive voltages based on the image signal.

Subsequently, in the step S11, the projection section 104 projects the object detecting image E3 on the projection surface 5a in accordance with the drive voltages based on the object detecting image data.

Subsequently, in the step S12, the imaging control section 42 makes the imaging section 106 take an image of the projection surface 5a on which the object detecting image E3 is projected. The imaging section 106 takes an image of the projection surface 5a to thereby generate the imaging data. It should be noted that in the step S12, the imaging control section 42 adjusts the exposure of the imaging section 106 so that the luminance of the patterns F3a through F3d of the object detecting image E3 falls within a predetermined luminance range similarly when imaging the projection position detecting pattern, and then makes the imaging section 106 take the image of the projection surface 5a.

The projection section 104 and the imaging section 106 are disposed as described above. Therefore, whatever areas in the projection surface 5a are irradiated with the object detecting pattern F3, it is possible for the decision section 45 to detect the object 7 located in that area.

When the imaging section 106 takes the image of the projection surface 5a on which the object detecting image E3 is projected to thereby generate the imaging data, the decision section 45 executes the processing of detecting the object 7 based on the imaging data in the step S13.

In the step S13, the decision section 45 first identifies the high luminance area in the taken image. Subsequently, when an area surrounded by the high luminance area exists in the taken image, the decision section 45 decides the area identified by adding the high luminance area to the area surrounded by the high luminance area as the object area. Subsequently, the decision section 45 detects the centroid position in the object area as the centroid position of the object 7 for each of the object areas.

It is desirable for the object 7 to have a shape and reflection characteristics with which the detection accuracy of the centroid position becomes high. For example, it is desirable for the object 7 to have a circular shape in a plan view, and have the reflection characteristics in which the closer to the centroid position, the higher the reflectance is. The shape of the object 7 is not limited to the circular shape, but can be a spherical shape.

It is possible for the decision section 45 to detect the position of the object 7 using a difference between the imaging data generated by the imaging section 106 which is set to the exposure value when generating the imaging data of the object 7 in the situation in which the projection section 104 projects an entirely black image similarly to the above, and the imaging data of the object 7. In this case, it becomes possible to prevent the environmental light from affecting the detection of the object 7.

The position of the object 7 is not limited to the centroid position of the object 7. For example, when the object 7 has a polygonal shape such as a quadrangular shape or an L shape, it is possible to use a vertex of the object 7, an edge of the object 7, or a corner of the object 7 as the position of the object 7. When the object 7 has a solid three-dimensional shape, it is possible for the decision section 45 to obtain the position of the object 7 taking the offset amount corresponding to the thickness into consideration.

Subsequently, when the object 7, furthermore, the centroid position of the object 7, fails to be detected in the step S14, the step S9 is executed.

In contrast, when the object 7, furthermore, the centroid position of the object 7, is detected in the step S14, the decision section 45 calculates the position information representing the position of the projection range in the liquid crystal panel coordinate system as the correction amount of the keystone distortion correction in the distortion correction section 102b in the step S15.

Here, the projection range in the liquid crystal panel coordinate system is a range in which the image to be projected in the entire area of the projection area 8e or a part of the projection area 8e out of the pixel area 12a of the liquid crystal light valve 12. The area in which the image to be projected in the entire area of the projection area 8e out of the pixel area 12a is generated is hereinafter referred to as a "specified area."

In the step S15, the decision section 45 transforms the position of the object 7 on the taken image to which the camera coordinate system is adopted into the coordinate position in the liquid crystal panel coordinate system using the projective transformation matrix generated in the step S10. Subsequently, the decision section 45 decides, for example, a quadrangular area having the positions of the four objects 7 on the liquid crystal light valve 12 as the vertexes, namely the specified area, as the projection range.

It should be noted that it is possible for the decision section 45 to calculate the projection range so that an outer edge of the generation image is located at the inner side than the outer edge of the specified area without overlapping the object area.

For example, the decision section 45 first generates the projective transformation matrix for the keystone distortion correction used to transform the positions of the four corners of the pixel area 12a in the liquid crystal coordinate system into the positions of the four corners of the specified area in the liquid crystal panel coordinate system. Subsequently, the decision section 45 calculates the corrected position distant as much as a predetermined offset amount from the position of the corner toward the central position of the pixel area 12a for each of the positions of the four corners of the pixel area 12a in the liquid crystal panel coordinate system. Subsequently, the decision section 45 transforms the correction positions of the positions of the four corners of the pixel area 12a into the positions of the four corners of the projection range included in the specified area using the projective transformation matrix for the keystone distortion correction.

It should be noted that the method of calculating the projection range included in the specified area is not limited to the method described above, but can arbitrarily be changed. For example, a reduction operation for reducing a magnification ratio of the specified area in order to set the projection range included in the specified area can be performed using an OSD (On Screen Display) menu, or the reduction operation can be performed with a remote controller. Subsequently, the decision section 45 sets the positional information of the projection range to the distortion correction section 102b.

Subsequently, in the step S16, when the positional information of the projection range is set, the distortion correction section 102b performs the keystone distortion correction on the output of the image combining section 102a based on the positional information.

It is conceivable when the posture of the projector 1 changes due to the own weight of the projector 1 or the like as described above after the execution of the step S16. In this case, the projection image after the keystone distortion correction runs off the projection area 8e. Therefore, when a predetermined period of time elapses in the step S17 from when the step S16 is completed, the process returns to the step S5.

In the step S17, in the situation in which the predetermined period of time does not elapse from when the step S16 is completed, when the operation receiving section 101 does not receive the termination operation in the step S18, the process returns to the step S17, and when the operation receiving section 101 has received the termination operation in the step S18, the process terminates.

A8. Projection Image after Keystone Distortion Correction

Figure 17:
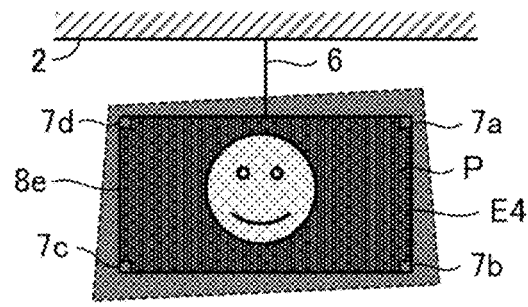
FIG. 17 is a diagram showing an example of a keystone distortion-corrected projection image.

FIG. 17 is a diagram showing an example of a post-keystone distortion correction projection image P which is projected after the keystone distortion correction is performed in the step S16. The post-keystone distortion correction projection image P is an example of the display image E4. In FIG. 17, the keystone distortion correction is performed so that the outer edge of the post-keystone distortion correction projection image P coincides with the outer edge of the projection area 8e.

Figure 18:
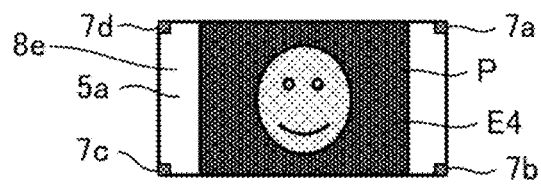
FIG. 18 is a diagram showing another example of the keystone distortion-corrected projection image.

As illustrated in FIG. 18, the keystone distortion correction can be performed so that the whole of the post-keystone distortion correction projection image P falls within the projection area 8e, and at the same time, an area where the post-keystone distortion correction projection image P does not exist out of the projection area 8e exists.

Figure 19:
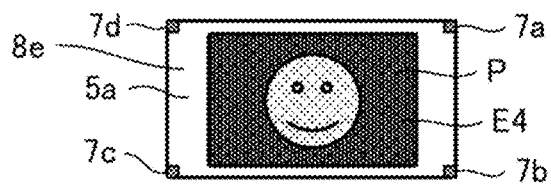
FIG. 19 is a diagram showing still another example of the keystone distortion-corrected projection image.

As illustrated in FIG. 19, it is possible to perform the keystone distortion correction of fitting the projection image into the projection area 8e while keeping the aspect ratio of the projection image based on the image data. In this case, it becomes possible to suppress the disturbance in the aspect ratio of the post-keystone distortion correction projection image P.

When such a keystone distortion correction as illustrated in FIG. 18 or FIG. 19 is performed, the area where the post-keystone distortion correction projection image P does not exist in the projection area 8e is displayed with, for example, a black color.

It is desirable to make it possible for the user to select the setting regarding the disposition of the post-keystone distortion correction projection image P with respect to the projection area 8e using a menu operation or the like.

A9. Conclusion

The projection system 1000, the method of controlling the projector 1, and the projector 1 according to the present disclosure described above include the following aspects.

The object 7 is the recursive reflector located in an area Ka of the projection surface 5a. The projection section 104 projects the object detecting image E3 and the display image E4 at respective timings different from each other. The imaging section 106 takes an image of the projection surface 5a in the situation in which the projection section 104 projects the object detecting image E3 on the projection surface 5a to thereby generate the imaging data. The decision section 45 identifies the position of the object 7 based on the imaging data to decide the projection area 8e in which the display image is projected based on the position of the object 7. The projection section 104 and the imaging section 106 are disposed so that the value obtained by dividing the luminance of the object 7 represented by the imaging data by the luminance of the projection surface 5a represented by the imaging data becomes no lower than the threshold value greater than 1.

According to this aspect, no matter what position in the projection surface 5a the object 7 is disposed at, the luminance of the object 7 becomes higher than the luminance of the projection surface 5a in the imaging data. Therefore, it is possible for the decision section 45 to identify the position of the object 7 based on the difference in luminance. Therefore, setting of the projection area 8e using the object 7 becomes possible.

The projection section 104 and the imaging section 106 are disposed so that the observation angle T2 as the angle formed between the first straight line L1 passing through the object 7 and the projection section 104 and the second straight line L2 passing through the object 7 and the imaging section 106 becomes within the predetermined angular range, for example, within the range no smaller than 0° and no larger than 10°.

According to this aspect, no matter what position in the projection surface 5a the object 7 is disposed at, it is possible for the decision section 45 to identify the position of the object 7 based on the imaging data. For example, when the projection surface 5a high in light scattering characteristic is used, as long as the observation angle T2 is no smaller than 0° and no larger than 10°, no matter what position in the projection surface 5a the object 7 is disposed at, it is possible for the decision section 45 to identify the position of the object 7 based on the imaging data.

The projection section 104 projects the guide image E1 representing the area Ka before projecting the object detecting image E3. According to this aspect, it is possible for the user to easily dispose the object 7 in the area Ka. Therefore, the probability that the imaging data represents the object 7 increases. Therefore, it is possible for the decision section 45 to identify the position of the object 7 based on the imaging data.

The area Ka is set so that the value obtained by dividing the luminance of the object 7 in the area Ka represented by the imaging data by the luminance of the projection surface 5a represented by the imaging data becomes higher than the threshold value. Therefore, no matter what position in the area Ka the object 7 is disposed at, it is possible for the decision section 45 to identify the position of the object 7 based on the imaging data. Therefore, setting of the projection area 8e using the object 7 becomes possible.

B. Modified Examples

It is possible to make such a variety of modifications as described below on the embodiment described above. Further, it is also possible to arbitrarily combine one or more modifications arbitrarily selected from the aspects of the modifications described below.

B1. First Modified Example

In the first embodiment, there is used the projection surface 5a high in light scattering characteristic. However, it is possible to use a projection surface high in specular reflection characteristic as the projection surface 5a. FIG. 20 through FIG. 23 are each a diagram showing the reflection characteristics U1 of light in the object 7, and reflection characteristics U3 of light in the projection surface 5a high in specular reflection characteristic. The projection surface 5a high in specular reflection characteristic is, for example, a whiteboard.

Figure 20:
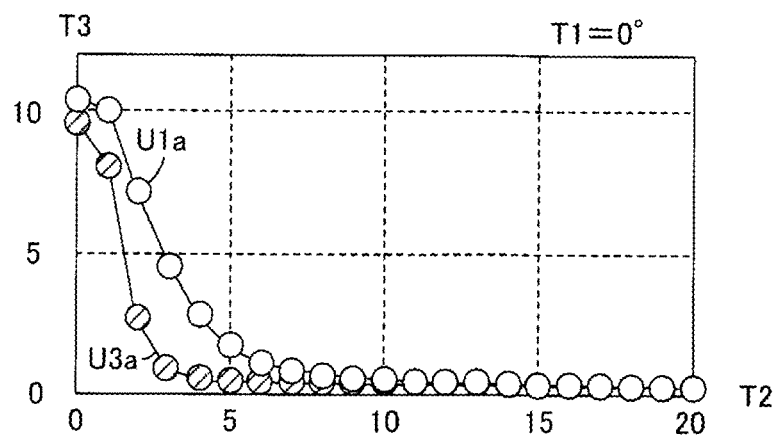
FIG. 20 is a diagram showing the reflection characteristics of light when the incident angle of the light is 0°.

FIG. 20 shows the reflection characteristics U1a of light in the object 7 when the incident angle T1 of the light is 0°, and the reflection characteristics U3a of light in the projection surface 5a when the incident angle T1 of the light is 0°.

Figure 21:
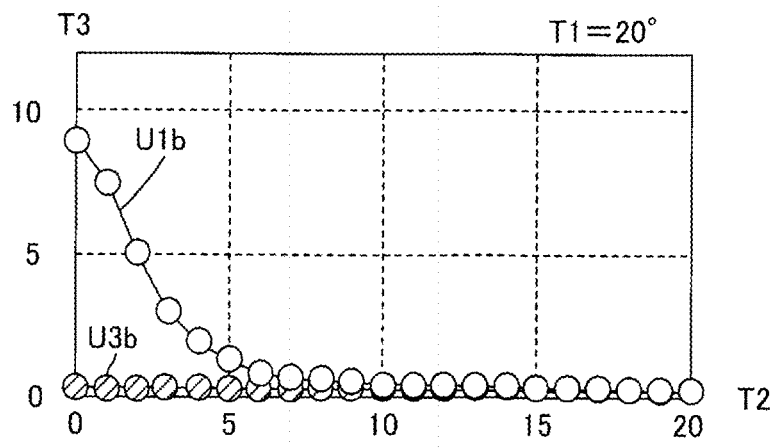
FIG. 21 is a diagram showing the reflection characteristics of light when the incident angle of the light is 20°.

FIG. 21 shows the reflection characteristics U1b of light in the object 7 when the incident angle T1 of the light is 20°, and the reflection characteristics U3b of light in the projection surface 5a when the incident angle T1 of the light is 20°.

Figure 22:
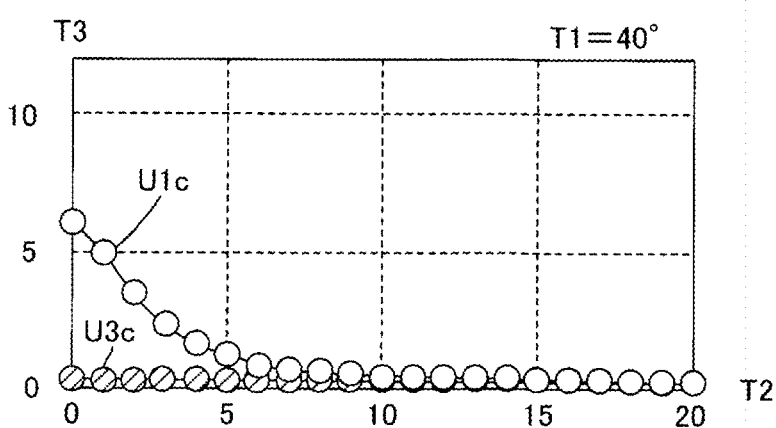
FIG. 22 is a diagram showing the reflection characteristics of light when the incident angle of the light is 40°.

FIG. 22 shows the reflection characteristics U1c of light in the object 7 when the incident angle T1 of the light is 40°, and the reflection characteristics U3c of light in the projection surface 5a when the incident angle T1 of the light is 20°.

Figure 23:
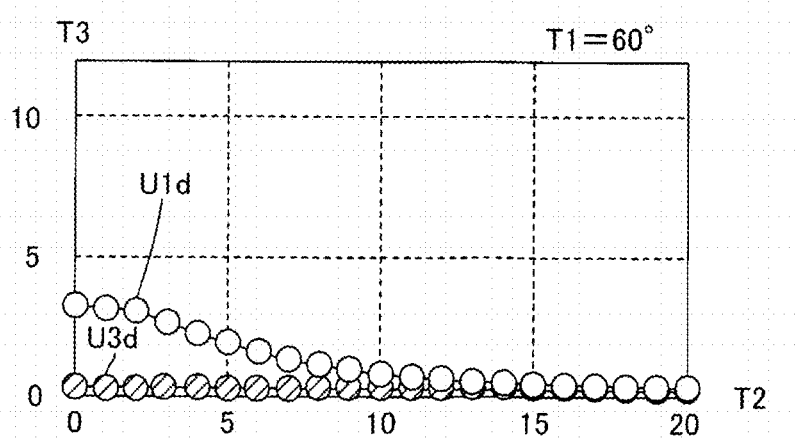
FIG. 23 is a diagram showing the reflection characteristics of light when the incident angle of the light is 60°.

FIG. 23 shows the reflection characteristics U1d of light in the object 7 when the incident angle T1 of the light is 60°, and the reflection characteristics U3d of light in the projection surface 5a when the incident angle T1 of the light is 20°.

In FIG. 20 through FIG. 23, the horizontal axis represents an observation angle T2, and the vertical axis represents reflection intensity T3. The scale of the vertical axis in FIG. 20 through FIG. 23 is different from the scale of the vertical axis in FIG. 10 through FIG. 13. Here, the fact that the specular reflection characteristic is high means that the incident angle T1 is equal or substantially equal to the reflection angle.

As shown in FIG. 20, when the projection surface 5a high in specular reflection characteristic is used, when both of the incident angle T1 and the observation angle T2 are 0°, the reflection intensity T3 of the projection surface 5a rises, and thus, the difference in reflection intensity T3 between the projection surface 5a and the object 7 decreases. Therefore, in the imaging data, the difference in luminance between the object 7 and the projection surface 5a decreases. Therefore, there is a possibility that it becomes unachievable for the decision section 45 to detect the position of the object 7 based on the imaging data.

In contrast, as shown in FIG. 20 through FIG. 23, even when the projection surface 5a high in specular reflection characteristic is used, when the observation angle T2 is no smaller than 2° and no larger than 10°, the value obtained by dividing the reflection intensity T3 of the object 7 by the reflection intensity T3 of the projection surface 5a becomes no lower than a threshold value.

The higher the reflection intensity T3 of the object 7 is, the higher the luminance of the object 7 represented by the imaging data becomes, and the higher the reflection intensity T3 of the projection surface 5a is, the higher the luminance of the projection surface 5a represented by the imaging data becomes.

Therefore, when the observation angle T2 is no smaller than 2° and no larger than 10°, the value obtained by dividing the luminance of the object 7 represented by the imaging data by the luminance of the projection surface 5a represented by the imaging data becomes no lower than the threshold value.

Therefore, when the projection surface 5a high in specular reflection characteristic is used, the user disposes the projection section 104 and the imaging section 106 so that the observation angle T2 as the angle formed between the first straight line L1 passing through the object 7 and the projection section 104 and the second straight line L2 passing through the object 7 and the imaging section 106 becomes within the range no smaller than 2° and no larger than 10°.

For example, the user adjusts the distance between the projector 1 and the projection surface 5a and the posture of the projector 1 with respect to the projection surface 5a to thereby set the observation angle T2 within the range no smaller than 2° and no larger than 10°.

According to this aspect, even when the projection surface 5a high in specular reflection characteristic is used, it is possible for the decision section 45 to identify the position of the object 7 based on the imaging data.

Further, the longer the distance between the projection section 104 and the imaging section 106 is, the larger the observation angle T2 becomes. Therefore, when the distance between the projection section 104 and the imaging section 106 can be adjusted, for example, when there is adopted the configuration in which the imaging section 106 is separated from the projector 1, the user adjusts the distance between the projection section 104 and the imaging section 106 and the posture of the projector 1 with respect to the projection surface 5a to thereby set the observation angle T2 within the range no smaller than 2° and no larger than 10°.

It should be noted that the range no smaller than 2° and no larger than 10° can arbitrarily be changed in accordance with the reflection characteristics of light by the object 7 and the degree of the specular reflection characteristic in the projection surface 5a.

Further, as shown in FIG. 21 through FIG. 23, when the incident angle T1 is within a range no smaller than 20° and no larger than 60°, the reflection intensity T3 becomes substantially constant even in the projection surface 5a high in specular reflection characteristic.

Therefore, when the projection surface 5a high in specular reflection characteristic is used, the user disposes the projection section 104 and the imaging section 106 so that the observation angle T2 as the angle formed between the first straight line L1 passing through the object 7 and the projection section 104 and the second straight line L2 passing through the object 7 and the imaging section 106 becomes within the range no smaller than 0° and no larger than 10°, and the incident angle T1 as the angle formed between a normal line n of the projection surface 5a and the first straight line L1 becomes within the range no smaller than 20° and no larger than 60°.

For example, the user adjusts the distance between the projector 1 and the projection surface 5a and the posture of the projector 1 with respect to the projection surface 5a to thereby set the observation angle T2 within the range no smaller than 0° and no larger than 10°, and at same time set the incident angle T1 within the range no smaller than 20° and no larger than 60°.

According to this aspect, even when the projection surface 5a high in specular reflection characteristic is used, it is possible for the decision section 45 to identify the position of the object 7 based on the imaging data.

Further, the longer the distance between the projection section 104 and the imaging section 106 is, the larger the observation angle T2 becomes. Therefore, when the distance between the projection section 104 and the imaging section 106 can be adjusted, for example, when there is adopted the configuration in which the imaging section 106 is separated from the projector 1, the user adjusts the distance between the projection section 104 and the imaging section 106 and the posture of the projector 1 with respect to the projection surface 5a to thereby set the observation angle T2 within the range no smaller than 0° and no larger than 10°, and at same time set the incident angle T1 within the range no smaller than 20° and no larger than 60°.

According to this aspect, even when the projection surface 5a high in specular reflection characteristic is used, it is possible for the decision section 45 to identify the position of the object 7 based on the imaging data.

It should be noted that the range no smaller than 0° and no larger than 10° and the range no smaller than 20° and no larger than 60° can arbitrarily be changed in accordance with the reflection characteristics of light by the object 7 and the degree of the specular reflection characteristic in the projection surface 5a.

Figure 24:
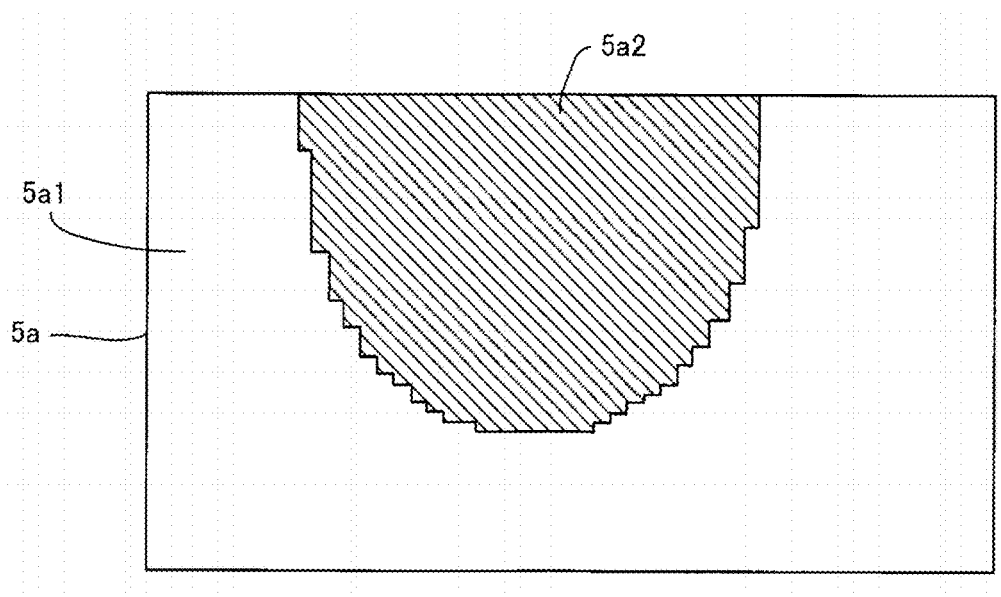
FIG. 24 is a diagram showing an example of an area where an object can be identified.

FIG. 24 is a diagram showing an area in which the object 7 can be identified based on the imaging data when the projector 1 as an ultrashort focus projector incorporating the imaging section 106 is installed in the following projection optical conditions. The projection optical conditions are the slow ratio=0.27, the offset=9.68:−1, the aspect ratio=16:9, and the projection area=65 inches. The condition of identifying the object 7 is that the luminance of the object is no lower than the luminance obtained by making the luminance of the projection surface 5a 1.5 times in the imaging data.

In FIG. 24, the distance between the projection section 104 and the imaging section 106 is set to 13.8 cm. The projection surface 5a has an unidentifiable area 5a2 in which the object 7 cannot be identified in addition to an identifiable area 5a1 in which the object 7 can be identified. It should be noted that the unidentifiable area 5a2 shown in FIG. 24 is an area in which the observation angle T2 is larger than 10°.

In this case, it is sufficient for the user to set the area in which the object 7 should be disposed in the identifiable area Sal. For example, the user sets an area which does not include the identifiable area 5a2 out of the areas on the four corners of the projection surface 5a as the area in which the object 7 should be disposed.

It is possible for the user to dissolve the unidentifiable area 5a2 by increasing the distance between the projector 1 and the projection surface 5a.

Figure 25:
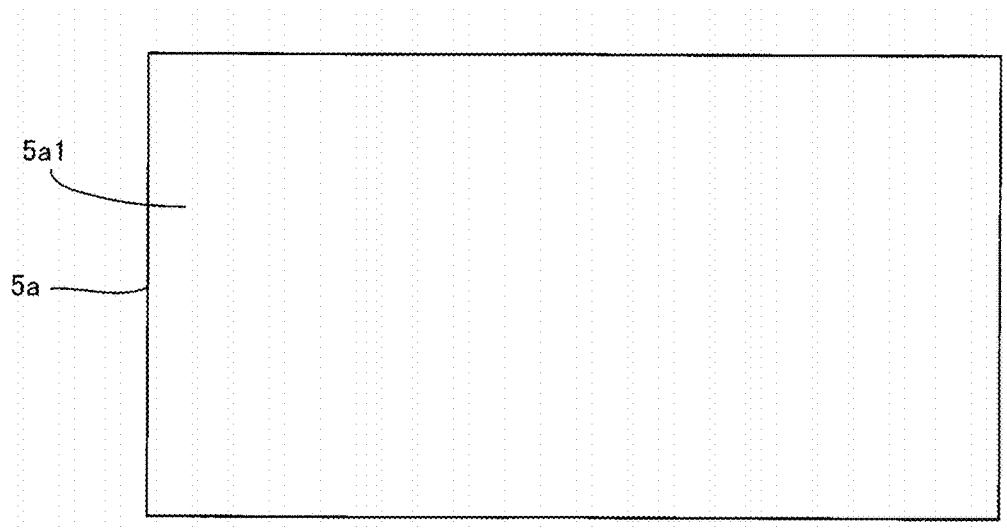
FIG. 25 is a diagram showing another example of the area where the object can be identified.

Further, it is possible for the user to dissolve the unidentifiable area 5a2 by decreasing the distance between the projection section 104 and the imaging section 106. FIG. 25 shows an example in which the unidentifiable area 5a2 is dissolved by decreasing the distance between the projection section 104 and the imaging section 106 from 13.8 cm to 7.0 cm. In the projection optical condition described above, it is desirable for the distance between the projection section 104 and the imaging section 106 to be not longer than 7.0 cm.

In a projection optical condition different from the projection optical condition described above such as a condition that the slow ratio is higher than 0.27 or a condition that the offset approximates zero, when the distance between the projection section 104 and the imaging section 106 decreases, the observation angle T2 and the incident angle T1 come closer to 0°. Therefore, when the projection surface 5a is the projection surface high in specular reflection characteristic, due to an influence of the specular reflection, the condition for identifying the object is not fulfilled.

In this case, the user changes the positional relationship of the projection section 104 and the imaging section 106 with respect to the projection surface 5a so that the observation angle T2 becomes within the range no smaller than 2° and no larger than 10°, or changes the positional relationship of the projection section 104 and the imaging section 106 with respect to the projection surface 5a so that the incident angle T1 becomes within the range no smaller than 20° and no larger than 60°.

B2. Second Modified Example

In the first embodiment and the first modified example, it is possible for the projection section 104 to project the four dots F2a through F2d in the vicinity of the position of the object 7 for each of the objects 7, and it is possible for the coordinate adjustment section 44 to generate the projective transformation matrix using the dots F2a through F2d located in the vicinity of the object 7 for each of the objects 7. In this case, from a local point of view, it becomes possible to reduce the influence of the distortion of the lens of the imaging section 106. In this case, the number of dots to be projected in the vicinity of the position of the object 7 can also be larger than 4.

B3. Third Modified Example

In the first embodiment and the first modified example through the second modified example, the recursive reflector used as the object 7 can be provided with the recursive reflection characteristic with respect to visible light, or can be provided with the recursive reflection characteristic with respect to nonvisible light such as infrared light. When the recursive reflector having the recursive reflection characteristic with respect to visible light is used as the object 7, the object detecting pattern F3 is constituted by light including the visible light. When the recursive reflector having the recursive reflection characteristic with respect to nonvisible light is used as the object 7, the object detecting pattern F3 is constituted by light including the nonvisible light.

B4. Fourth Modified Example

In the first embodiment and the first modified example through the third modified example, the positions of the four objects 7 are not limited to the four corners of the projection surface 5*a*. For example, the position of each of the four objects 7 can be a position at the inner side of the corner of the projection surface 5*a*.

B5. Fifth Modified Example

Figure 26:
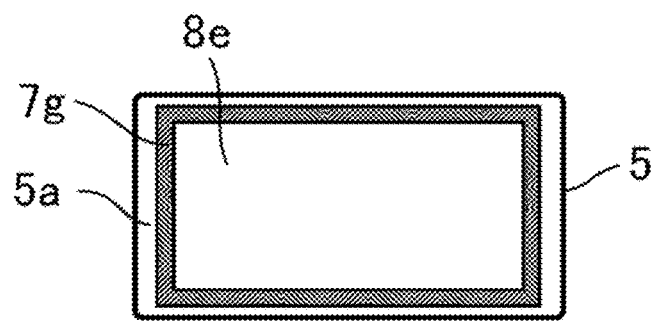
FIG. 26 is a diagram showing an example of the object.

In the first embodiment and the first modified example through the fourth modified example, the number of the objects 7 is not limited to 4, but is sufficiently one or more. For example, when an object 7*g* having a shape surrounding the projection area 8*e* having a rectangular shape is used as shown in FIG. 26, it is sufficient for the number of the objects 7 to be 1. In this case, the user adjusts either one or both of the position of the guide image E1 and the position of the object 7*g* so that each of the four corners of the object 7*g* is located in a first guide area F11 in the guide image E1. In this aspect, since the projection area 8*e* can be set by the single object 7, it becomes easy to set the projection area 8*e* compared to when setting the projection area 8*e* using the four objects 7.

Figure 27:
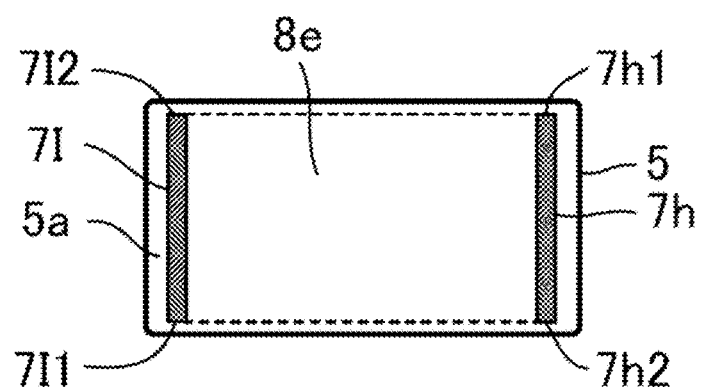
FIG. 27 is a diagram showing another example of the object.

Further, when an object 7*h* shaped like a straight line defining the right side of the projection area 8*e*, and an object 7I shaped like a straight line defining the left side of the projection area 8*e* are used as shown in FIG. 27, it is sufficient for the number of the objects 7 to be 2. In this case, the user adjusts at least one of the position of the guide image E1, the position of the object 7*h*, and the position of the object 7I so that an end 7*h*1 of the object 7*h* is located in the upper right area F1*a*, the other end 7*h*2 of the object 7*h* is located in the lower right area F1*b*, one end 7I1 of the object 7I is located in the lower left area F1*c*, and the other end 7I2 of the object 7I is located in the upper left area F1*d*. In this aspect, since the projection area 8*e* can be set by the two objects 7, it becomes easy to set the projection area 8*e* compared to when setting the projection area 8*e* using the four objects 7.

B6. Sixth Modified Example

In the first embodiment and the first modified example through the fifth modified example, in the guide image E1, the whole or a part of the first message M1 and the second message M2 can be omitted. Further, in the guide image E1, the second guide area F12 can be omitted together with the second message M2.

B7. Seventh Modified Example

In the first embodiment and the first modified example through the sixth modified example, the range of the first guide area F11 can be a movable range in which the four corners of the projection image can be moved by the distortion correction section 102*b* performing the keystone distortion correction, or can be a range included in the movable range.

B8. Eighth Modified Example

In the first embodiment and the first modified example through the seventh modified example, when the projection position detecting pattern F2 is performed using nonvisible light such as infrared light, the second guide area F12 and the second message M2 is omitted from the guide image E1. When the projection position detecting pattern F2 is performed using the nonvisible light such as the infrared light, since the projection position detecting pattern F2 is not recognized by the user, it becomes possible to execute the step S5 while the user is unaware of the execution. When the object detecting pattern F3 is performed using the nonvisible light such as the infrared light, since the object detecting pattern F3 is not recognized by the user, it becomes possible to execute the step S11 while the user is unaware of the execution.

B9. Ninth Modified Example

In the first embodiment and the first modified example through the eighth modified example, a movable surface such as an elevator door can be used as the projection surface 5*a*. In this case, for example, when the elevator door on which the object 7 is located opens, it becomes possible to make the projection image darker, or to stop the projection of the projection image.

B10. Tenth Modified Example

In the first embodiment and the first modified example through the ninth modified example, it is possible for the object 7 to be fixed to the projection surface 5*a* with a magnetic force or an adhesion member. It should be noted that the method of fixing the object 7 to the projection surface 5*a* can arbitrarily be changed.

B11. Eleventh Modified Example

In the first embodiment and the first modified example through the tenth modified example, when the storage section 107 stores the image data, it is possible for the image combining section 102*a* to use the image data stored by the storage section 107 instead of the received image data.

B12. Twelfth Modified Example

In the first embodiment and the first modified example through the eleventh modified example, in the projection section 104, there are used the liquid crystal light valves as the light modulation device. However, the light modulation device is not limited to the liquid crystal light valves. For example, it is also possible for the light modulation device to have a configuration using three reflective liquid crystal panels. It is possible for the light modulation device to have a configuration such as a system having a single liquid crystal panel and a color wheel combined with each other, a system using three digital mirror devices, or a system having a single digital mirror device and a color wheel combined with each other. When the light modulation device is just one liquid crystal panel or just one digital mirror device, the members corresponding to the color separation optical system and the color combining optical system are unnecessary. Further, besides the liquid crystal panel or the digital mirror device, any configurations capable of modulating the light emitted by the light source can be adopted as the light modulation device.

B13. Thirteenth Modified Example

In the first embodiment and the first modified example through the twelfth modified example, the step S9 can be omitted.

What is claimed is:

1. A projection system comprising:
    a recursive reflector located in a first area of a projection surface;
    a projection device configured to project a first image and a second image at respective timings different from each other;
    an imaging device configured to image a first projection area in a situation in which the projection device projects the first image in the first projection area including the first area to thereby generate imaging data; and
    a control device configured to identify a position of the recursive reflector based on the imaging data, and decide a second projection area in which the second image is projected based on the position of the recursive reflector, wherein
    the projection device and the imaging device are disposed so that a contrast ratio between the recursive reflector and a periphery of the recursive reflector represented by the imaging data becomes equal to or higher than a predetermined value.

2. The projection system according to claim 1, wherein the projection device and the imaging device are disposed so that a value obtained by dividing a luminance of the recursive reflector represented by the imaging data by a luminance of the projection surface represented by the imaging data becomes equal to or higher than a threshold value as a value greater than 1.

3. The projection system according to claim 1, wherein the projection device and the imaging device are disposed so that an angle formed between a first straight line passing through the recursive reflector and the projection device and a second straight line passing through the recursive reflector and the imaging device becomes within a predetermined angular range.

4. The projection system according to claim 3, wherein the predetermined angular range is a range no smaller than 0° and no larger than 10°.

5. The projection system according to claim 4, wherein the first area is a flat surface, and
    the projection device is disposed so that an angle formed between a normal line of the first area and the first straight line becomes within a range no smaller than 20° and no larger than 60°.

6. The projection system according to claim 3, wherein the predetermined angular range is a range no smaller than 2° and no larger than 10°.

7. The projection system according to claim 1, wherein the projection device projects a guide image representing the first area before projecting the first image.

8. A method of controlling a projector including a projection section configured to project an image and an imaging section configured to perform imaging, the method comprising:
    projecting a guide image representing a first area in which a recursive reflector is to be disposed out of a projection surface from the projection section;
    projecting a first image in a first projection area including the first area in which the recursive reflector is disposed from the projection section;
    imaging the first projection area with the imaging section in a situation in which the projection section projects the first image in the first projection area to thereby generate imaging data;
    identifying a position of the recursive reflector based on the imaging data; and
    deciding a second projection area in which the second image is projected by the projection section based on the position of the recursive reflector, wherein
    the first area is set so that a contrast ratio between the recursive reflector and a periphery of the recursive reflector represented by the imaging data becomes equal to or higher than a predetermined value.

9. The method of controlling the projector according to claim 8, wherein
    the first area is set so that a value obtained by dividing a luminance of the recursive reflector represented by the imaging data by a luminance of the projection surface represented by the imaging data becomes equal to or higher than a threshold value as a value greater than 1.

10. A projector comprising:
    a projection section configured to project a guide image representing a first area in which a recursive reflector is to be disposed out of a projection surface, and project a first image in a first projection area including the first area in which the recursive reflector is disposed after projecting the guide image;
    an imaging section configured to image the first projection area in a situation in which the projection section projects the first image in the first projection area to thereby generate imaging data; and
    a decision section configured to identify a position of the recursive reflector based on the imaging data, and decide a second projection area in which a second image is projected by the projection section based on the position of the recursive reflector, wherein
    the first area is set so that a contrast ratio between the recursive reflector and a periphery of the recursive reflector represented by the imaging data becomes equal to or higher than a predetermined value.

11. The projector according to claim 10, wherein
    the first area is set so that a value obtained by dividing a luminance of the recursive reflector represented by the imaging data by a luminance of the projection surface represented by the imaging data becomes equal to or higher than a threshold value as a value greater than 1.

* * * * *